US006995229B2

(12) United States Patent
Kashiwa et al.

(10) Patent No.: US 6,995,229 B2
(45) Date of Patent: Feb. 7, 2006

(54) POLYMER AND PROCESS FOR PRODUCING THE SAME

(75) Inventors: Norio Kashiwa, Chiba (JP); Shinichi Kojoh, Chiba (JP); Shingo Matsuo, Chiba (JP); Junji Saito, Chiba (JP); Terunori Fujita, Chiba (JP); Makoto Mitani, Chiba (JP); Mamoru Takahashi, Chiba (JP); Yasuo Sato, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/088,995

(22) PCT Filed: Jul. 26, 2001

(86) PCT No.: PCT/JP01/06447

§ 371 (c)(1),
(2), (4) Date: Mar. 26, 2002

(87) PCT Pub. No.: WO02/08306

PCT Pub. Date: Jan. 31, 2002

(65) Prior Publication Data

US 2003/0120003 A1 Jun. 26, 2003

(30) Foreign Application Priority Data

Jul. 26, 2000 (JP) .............................. 2000-225964

(51) Int. Cl.
*C08F 210/00* (2006.01)
(52) U.S. Cl. .................................... 526/348.6; 526/172
(58) Field of Classification Search ................ 526/348, 526/358, 172, 348.6
See application file for complete search history.

(56) References Cited

U.S. PATENT DOCUMENTS

| 5,321,106 A | 6/1994 | LaPointe ..................... 526/126 |
| 5,475,075 A * | 12/1995 | Brant et al. |
| 6,225,410 B1 | 5/2001 | Sugimura et al. |

(Continued)

FOREIGN PATENT DOCUMENTS

EP    0 926 169 A    6/1999

(Continued)

OTHER PUBLICATIONS

Aggarwal, S.L. et al., Determination of Crystallinity in Polyethylene by X-Ray Diffractometer, Journal of Polymer Science, vol. XVIII, pp 17-26 (1955).

(Continued)

*Primary Examiner*—Caixia Lu
(74) *Attorney, Agent, or Firm*—Buchanan Ingersoll PC

(57) ABSTRACT

The present invention relates to a polymer having a melt tension (MT (g)) substantially the same as or lower than that of a conventional polymer which is substantially the same as the polymer in the recurring unit of the main skeleton, the molecular weight, the molecular weight distribution and the crystallinity, and having a flow activation energy (Ea (KJ/mol)) larger than a value obtained by adding 5 KJ/mol to the Ea value of the conventional polymer. A preferred example of the polymer is a branched polyolefin comprising 50 to 100% by mol of recurring units derived from ethylene and 0 to 50% by mol of recurring units derived from an α-olefin of 3 to 20 carbon atoms and having the following properties: the flow activation energy (Ea (KJ/mol)) and the α-olefin content (C (% by weight)) satisfy a specific relation, and the melt tension (MT (g)) and the melt flow rate (MFR (g/10 min)) satisfy a specific relation. This branched polyolefin is excellent in moldability and mechanical strength.

4 Claims, 2 Drawing Sheets

U.S. PATENT DOCUMENTS 6,444,773 B1 * 9/2002 Markel

FOREIGN PATENT DOCUMENTS

| EP | 0 982 362 A1 | 3/2000 |
| --- | --- | --- |
| JP | 1-501950 | 7/1989 |
| JP | 1-502036 | 7/1989 |
| JP | 2-78687 | 3/1990 |
| JP | 3-179005 | 8/1991 |
| JP | 3-179006 | 8/1991 |
| JP | 3-207703 | 9/1991 |
| JP | 3-207704 | 9/1991 |
| JP | 8-502303 | 3/1996 |
| JP | 10-316711 | 12/1998 |
| JP | 2000-38418 | 2/2000 |
| WO | 01/16192 A1 | 3/2001 |

OTHER PUBLICATIONS

English abstract and machine translation of JP 2000-063415 published Feb. 29, 2000.

* cited by examiner

Fig. 1

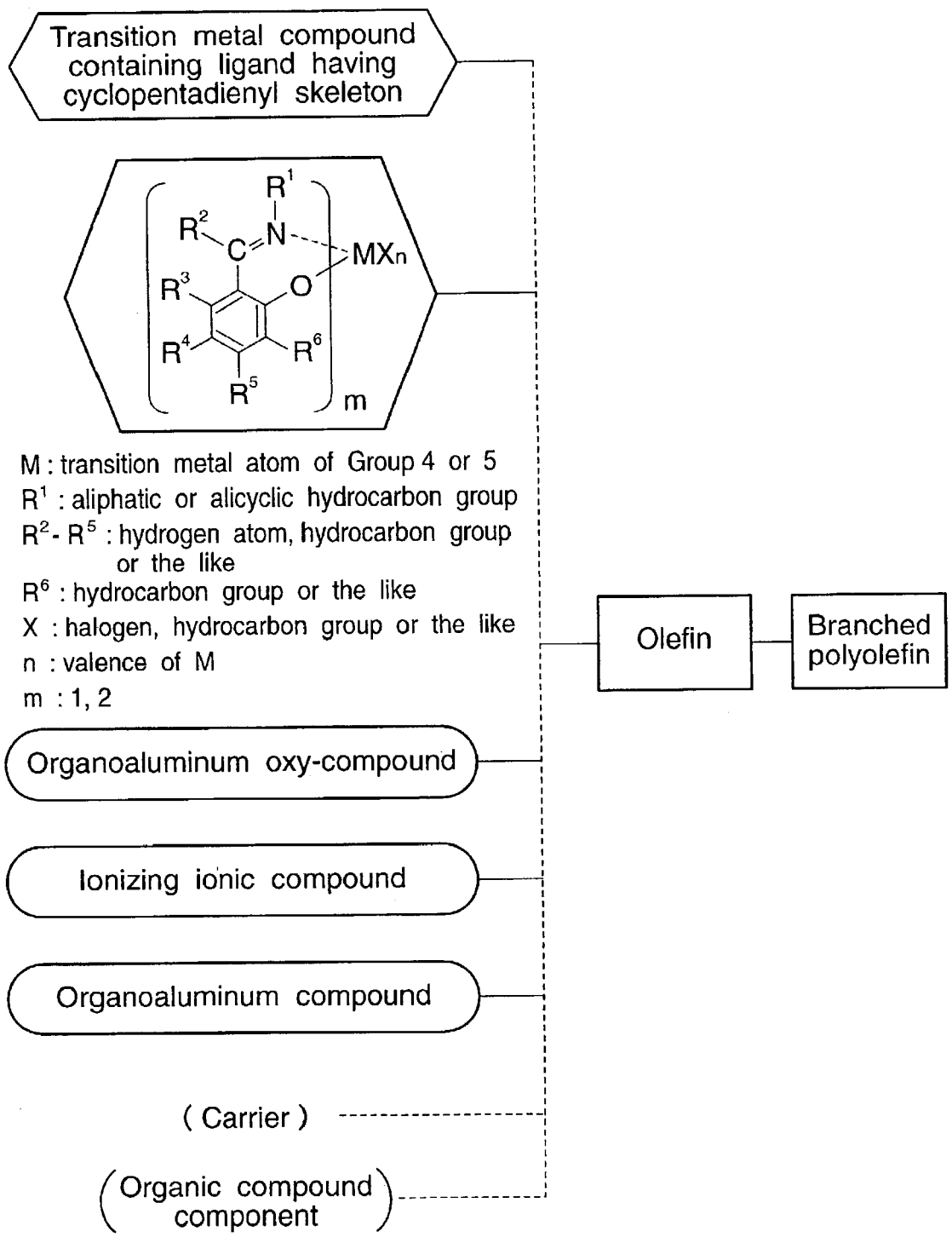

M : transition metal atom of Group 4 or 5
$R^1$ : aliphatic or alicyclic hydrocarbon group
$R^2$-$R^5$ : hydrogen atom, hydrocarbon group or the like
$R^6$ : hydrocarbon group or the like
X : halogen, hydrocarbon group or the like
n : valence of M
m : 1, 2

Organoaluminum oxy-compound

Ionizing ionic compound

Organoaluminum compound ( Carrier )

( Organic compound component )

Olefin → Branched polyolefin

POLYMER AND PROCESS FOR PRODUCING THE SAME

TECHNICAL FIELD

The present invention relates to novel polymers having equivalent or smaller melt tension (MT (g)) and larger flow activation energy value than conventional polymers having equivalent recurring unit of the main skeleton and substantially the same molecular weight, molecular weight distribution and crystallinity as those of the novel polymers. More particularly, the invention relates to a branched polyolefin of novel structure among the above polymers, said branched polyolefin mainly containing ethylene units and a side chain composed of an olefin chain having few methyl branches, and a process for preparing the same.

BACKGROUND ART

Low-density polyethylene (LDPE) produced by a high-pressure radical method is well known as a branched polyolefin, and the side chain of the LDPE has a non-linear tree-like structure. Such a structure is excellent in moldability and advantageous in melt processing, but on the other hand, it has a disadvantage of lowering mechanical strength of the polymer.

In the use application where mechanical strength is necessary, therefore, linear low-density polyethylene (LLDPE) obtained by copolymerization of ethylene and a higher α-olefin is generally employed. However, the length of the side chain of the LLDPE is extremely shorter than that of the LDPE, so that the LLDPE does not have good moldability that is an advantage of the LDPE.

On this account, development of branched polyethylene which is superior to the LDPE in mechanical strength and melt processability has been made enthusiastically. For example, a macromonomer produced by the use of a metallocene catalyst is copolymerized with ethylene to obtain a branched polymer satisfying the above-mentioned properties, as described in National Publication of International Patent No. 502303/1996. The polymer obtained by the process described in this publication has a structure similar to that of LLDPE, and its side chain does not become completely linear and has a methyl branch. Although the polymer of this structure is superior to LDPE in mechanical strength, the methyl branch lowers mechanical strength, and therefore the mechanical strength of the polymer is sometimes unsatisfactory depending upon the purpose.

In Japanese Patent Laid-Open Publications No. 316711/1998 and No. 38418/2000, a process for preparing a branched polymer by copolymerizing a macromonomer and an α-olefin is disclosed, but a method of inhibiting formation of methyl branch of the side chain has not been known yet. For the invention described in the above publications, it is difficult to control the weight-average molecular weight of the side chain to be in the range of 1,000 to 10,000, and there is a limitation on the process for preparing a branched polymer having a main chain and a side chain different in the composition.

In National Publication of International Patent No. 502303/1996, there is disclosed a branched polyolefin comprising: a main chain (b) of a homopolymer or a copolymer of C2–C30 alpha olefins; and side chains (a) of at least 250 carbon atoms comprising a homopolymer or a copolymer of C2–C30 alpha olefins, said side chains being distributed along the polymer main chain at an average frequency of 0.1 to 5 side chains per 1000 main chain carbon atoms, said branched polymer having a weight average molecular weight of at least 30,000 and an MW/Mn of 6 or less.

In view of such prior art as described above, the present inventors have found novel polymers having equivalent or smaller melt tension (MT (g)) and larger flow activation energy value than conventional polymers having equivalent recurring unit of the main skeleton and substantially the same molecular weight, molecular weight distribution and crystallinity as those of the novel polymers. The present inventors have further found a branched polyolefin of novel structure among the above polymers, said polyolefin mainly containing mainly ethylene units and a side chain composed of an olefin chain having few methyl branches, and a process for preparing the branched polyolefin. The present inventors have studied, as the branched polyolefin, a branched polyolefin containing scarcely any methyl branch and having a specific weight-average molecular weight, and as a result, they have found that the desired branched polyolefin can be obtained by the use of a catalyst containing specific two different transition metal compounds. Based on the finding, the present invention has been accomplished.

That is to say, it is an object of the present invention to provide a novel polymer having characteristic melt tension and flow activation energy which are not observed in the conventional polymers, and in particular, it is an object of the invention to provide a branched polyolefin having excellent moldability and mechanical strength and a process for preparing the same.

DISCLOSURE OF THE INVENTION

The novel polymer according to the invention is a polymer having a melt tension (MT (g)) that is substantially the same as or lower than that of a conventional polymer which is substantially the same as this novel polymer in the recurring unit of the main skeleton, the molecular weight, the molecular weight distribution and the crystallinity, and having a flow activation energy (Ea (KJ/mol)) that is larger than a value obtained by adding 5 KJ/mol to the Ea value of the conventional polymer.

In an embodiment of this polymer, it is desirable that the recurring unit of the main skeleton is constituted of carbon and hydrogen, and optionally oxygen, and the polymer is substantially thermoplastic Another embodiment of this polymer is a polymer which has branches and in which the main skeleton is constituted of olefins of 2 to 8 carbon atoms.

The first embodiment of the branched polyolefin according to the invention is a branched polyolefin comprising 50 to 100% by mol of recurring units derived from ethylene and 0 to 50% by mol of recurring units derived from an α-olefin of 3 to 7 carbon atoms and having the following properties:

the flow activation energy (Ea (KJ/mol)) and the α-olefin content (C (% by weight)) satisfy the following relation:

in the case where the number of carbon atoms of the α-olefin is 3 and $C \geq 10\%$ by weight:

$Ea \geq 0.130 \times C + 28.7$, in the case where the number of carbon atoms of the α-olefin is 4 to 7 and $C \geq 4.1\%$ by weight:

$Ea \geq 0.385 \times C + 28.7$, in the case where the number of carbon atoms of the α-olefin is 3 and $C < 10\%$ by weight (including the case where the α-olefin content is 0), and in the case where the number of carbon atoms of the α-olefin is 4 to 7 and $C < 4.1\%$ by weight:

$Ea \geq 30$, and the melt tension (MT (g)) and the melt flow rate (MFR (g/10 min)) satisfy the following relation:

$MT \leq 2.2 \times MFR^{-0.88}$.

This branched polyolefin comprises, for example, (i) recurring units derived from at least one olefin selected from ethylene and olefins of 3 to 7 carbon atoms, and (ii) recurring units derived from a vinyl-terminated macromonomer comprising 50 to 100% by mol of recurring units derived from ethylene and 50 to 0% by mol of recurring units derived from an olefin of 4 to 7 carbon atoms, having a weight-average molecular weight of 600 to 3,500 and having less than 0.1 methyl branch, as measured by $^{13}$C-NMR, based on 1,000 carbon atoms.

The second embodiment of the branched polyolefin according to the invention is a branched polyolefin comprising 50 to 100% by mol of recurring units derived from ethylene and 0 to 50% by mol of recurring units derived from an α-olefin of 8 to 20 carbon atoms and having the following properties:

the flow activation energy (Ea (KJ/mol)) and the α-olefin content (C (% by weight)) satisfy the following relation:

in the case of C≧4.1% by weight:
Ea≧0.385×C+28.7,
in the case of C<4.1% by weight:
Ea≧30,
and
the melt tension (MT (g)) and the melt flow rate (MFR (g/10 min)) satisfy the following relation:
MT≦2.2×MFR$^{-0.88}$.

This branched polyolefin comprises, for example, (i) recurring units derived from at least one olefin selected from ethylene and olefins of 8 to 20 carbon atoms, and (ii) recurring units derived from a vinyl-terminated macromonomer comprising 50 to 100% by mol of recurring units derived from ethylene and 50 to 0% by mol of recurring units derived from an olefin of 3 to 20 carbon atoms, having a weight-average molecular weight of 600 to 3,500 and having less than 0.1 methyl branch, as measured by $^{13}$C-NMR, based on 1,000 carbon atoms.

The third embodiment of the branched polyolefin according to the invention is a branched polyolefin comprising:

(i) recurring units derived from at least one olefin selected from olefins of 2 to 20 carbon atoms, and (ii) recurring units derived from a vinyl-terminated macromonomer comprising 50 to 100% by mol of recurring units derived from ethylene and 50 to 0% by mol of recurring units derived from an olefin of 4 to 20 carbon atoms, having a weight-average molecular weight of 600 to 200,000 and having less than 0.1 methyl branch, as measured by $^{13}$C-NMR, based on 1,000 carbon atoms.

This embodiment includes a preferred embodiment wherein the weight-average molecular weight of the vinyl-terminated macromonomer is in the range of 1,000 to 10,000, and further includes another preferred embodiment wherein the weight-average molecular weight of the vinyl-terminated macromonomer is in the range of 600 to 3,500.

The process for preparing a branched polyolefin according to the invention is a process comprising polymerizing at least one olefin selected from olefins of 2 to 20 carbon atoms using an olefin polymerization catalyst comprising:

(A) a transition metal compound containing a ligand having cyclopentadienyl skeleton, (B) a transition metal compound represented by the following formula (I), and (C) at least one compound selected from:
(C-1) an organometallic compound,
(C-2) an organoaluminum oxy-compound, and
(C-3) a compound which reacts with the transition metal compound (A) or the transition metal compound (B) to form an ion pair, to prepare any one of the above-described branched polyolefins;

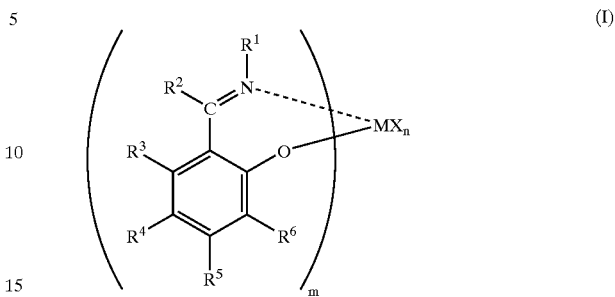

(I)

wherein M is a transition metal atom of Group 4 to Group 5 of the periodic table, m is an integer of 1 to 2, $R^1$ is an aliphatic hydrocarbon group or an alicyclic hydrocarbon group, $R^2$ to $R^5$ may be the same or different and are each a hydrogen atom, a hydrocarbon group, a hydrocarbon-substituted silyl group, an oxygen-containing group, a nitrogen-containing group or a sulfur-containing group, $R^6$ is a hydrocarbon group or a hydrocarbon-substituted silyl group, n is a number satisfying a valence of M, X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring.

In the process for preparing a branched polyolefin according to the invention, it is also preferable that the polymerization is carried out continuously under at least two different polymerization conditions, and the polymerization includes polymerization conducted under such conditions that the yield of a polymer produced by the transition metal compound (B) becomes higher than the yield of a polymer produced by the transition metal compound (A) and polymerization conducted under such conditions that the yield of a polymer produced by the transition metal compound (A) becomes higher than the yield of a polymer produced by the transition metal compound (B).

BRIEF DESCRIPTION OF THE DRAWINGS

FIG. 1 is an explanatory view showing steps for preparing an olefin polymerization catalyst for use in the present invention.

BEST MODE FOR CARRYING OUT THE INVENTION

Figure 2:
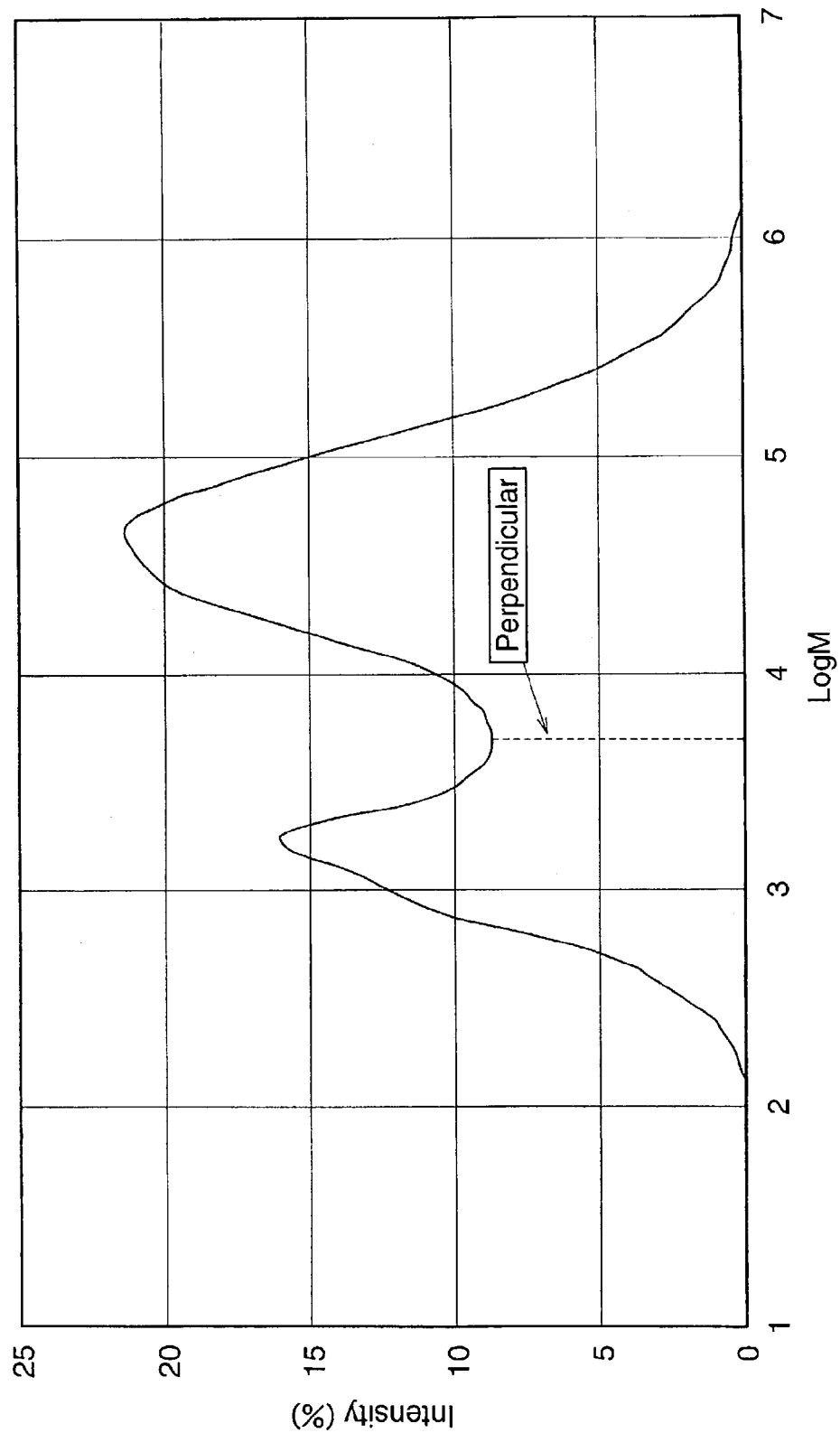
FIG. 2 is a GPC chart of a polymer obtained in Example 1.

The polymers according to the invention, such as a branched polyolefin, and a process for preparing the same are described in detail hereinafter The meaning of the term "polymerization" used herein is not limited to "homopolymerization" but may comprehend "copolymerization". Also, the meaning of the term "polymer" used herein is not limited to "homopolymer" but may comprehend "copolymer".

The novel polymer according to the invention is a polymer having a melt tension (MT (g)) that is substantially the same as or lower than that of a conventional polymer which is substantially the same as this novel polymer in the recurring unit of the main skeleton, the molecular weight, the molecular weight distribution and the crystallinity, and having a flow activation energy (Ea (KJ/mol)) that is larger than a value obtained by adding 5 KJ/mol to the Ea value of the conventional polymer.

The expression "substantially the same" used herein means that, as compared with the polymer of the invention, the type of the recurring unit is identical, a difference in the molecular weight (weight-average molecular weight) is in the range of ±30%, a difference in the molecular weight distribution (Mw/Mn) is in the range of ±30%, and a difference in the crystallinity is in the range of ±10%.

The crystallinity can be measured by X-ray diffractometry (S. L. AGGARWAL; *J. Polymer Sci.* 18, 17 (1955)) or the like.

The recurring unit of the main chain of the polymer is not specifically limited, and various recurring units can be exemplified. Of these, preferable is a recurring unit constituted of carbon and hydrogen, or carbon, hydrogen and oxygen, and the polymer is desired to be substantially thermoplastic.

Examples of the recurring units include olefins, such as an α-olefin, a cycloolefin, a diolefin and an aromatic group-containing vinyl compound. Of these, olefins of 2 to 8 carbon atoms are desirable.

The first embodiment of the branched polyolefin according to the invention comprises recurring units derived from ethylene and recurring units derived from an α-olefin of 3 to 20 carbon atoms.

Examples of the α-olefins of 3 to 20 carbon atoms include straight-chain or branched α-olefins of 3 to 20 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and cycloolefins of 4 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronap hthalene. In the branched polyolefin, two or more kinds of the recurring units derived from the α-olefins of 3 to 20 carbon atoms may be contained.

When the branched polyolefin of the invention comprises 50 to 100% by mol of recurring units derived from ethylene and 0 to 50% by mol of recurring units derived from an α-olefin of 3 to 7 carbon atoms, this branched polyolefin has the following properties:

the flow activation energy (Ea (KJ/mol)) and the α-olefin content (C (% by weight)) satisfy the following relation:

in the case where the number of carbon atoms of the α-olefin is 3 and C≧10% by weight:
Ea≧0.130×C+28.7,
preferably Ea≧0.144×C+28.7,
more preferably Ea≧0.178×C+28.7, in the case where the number of carbon atoms of the α-olefin is 4 to 7 and C≧4.1% by weight:
Ea≧0.385×C+28.7,
preferably Ea≧0.425×C+28.7,
more preferably Ea≧0.528×C+28.7, in the case where the number of carbon atoms of the α-olefin is 3 and C<10% by weight (including the case where the α-olefin content is 0), and in the case where the number of carbon atoms of the α-olefin is 4 to 7 and C<4.1% by weight:

Ea≧30,
preferably Ea≧35,
more preferably Ea≧40,
and the melt tension (MT (g)) and the melt flow rate (MFR (g/10 min)) satisfy the following relation:
MT≦2.2×MFR$^{-0.88}$,
preferably MT≦2.0×MFR$^{-0.88}$.

The first embodiment of the branched polyolefin comprises, for example, (i) recurring units derived from at least one olefin selected from ethylene and olefins of 3 to 7 carbon atoms, and (ii) recurring units derived from a vinyl-terminated macromonomer comprising 50 to 100% by mol of recurring units derived from ethylene and 50 to 0% by mol of recurring units derived from an olefin of 4 to 7 carbon atoms, having a weight-average molecular weight of 600 to 3,500 and having less than 0.1 methyl branch, as measured by $^{13}$C-NMR, based on 1,000 carbon atoms.

This vinyl-terminated macromonomer has a weight-average molecular weight (Mw), as measured by gel permeation chromatography (GPC), of usually of 600 to 3,500, preferably 700 to 3,500, more preferably 800 to 3,500, and Mw/Mn (Mn: number-average molecular weight) of usually not less than 1.5 and less than 4.0, preferably not less than 1.8 and less than 3.8.

In the vinyl-terminated macromonomer, the number of methyl branches, as measured by $^{13}$C-NMR, is usually less than 0.1, preferably less than 0.08, more preferably less than 0.05, based on 1,000 carbon atoms.

The vinyl-terminated macromer can be prepared by copolymerizing ethylene and an olefin of 4 to 7 carbon atoms or polymerizing ethylene alone, using a catalyst containing, for example, the later-described transition metal compound (B).

This branched polyolefin has a weight-average molecular weight of usually 30,000 to 500,000, preferably 50,000 to 200,000, and MFR of usually 0.01 to 100 g/10 min, preferably 0.05 to 10 g/10 min.

The second embodiment of the branched polyolefin according to the invention, which comprises 50 to 100% by mol of recurring units derived from ethylene and 0 to 50% by mol of recurring units derived from an α-olefin of 8 to 20 carbon atoms, has the following properties:

the flow activation energy (Ea (KJ/mol)) and the α-olefin content (C (% by weight)) satisfy the following relation:
in the case of C≧4.1% by weight:
Ea≧0.385×C+28.7,
preferably Ea≧0.425×C+28.7,
more preferably Ea≧0.528×C+28.7,
in the case of C<4.1% by weight:
Ea≧30,
preferably Ea≧35,
more preferably Ea≧40,
and the melt tension (MT (g)) and the melt flow rate (MFR (g/10 min)) satisfy the following relation:
MT≦2.2×MFR$^{-0.88}$,
preferably MT≦2.0×MFR$^{-0.88}$.

The second embodiment of the branched polyolefin comprises, for example, (i) recurring units derived from at least one olefin selected from ethylene and olefins of 8 to 20 carbon atoms, and (ii) recurring units derived from a vinyl-terminated macromonomer comprising 50 to 100% by mol of recurring units derived from ethylene and 50 to 0% by mol of recurring units derived from an olefin of 3 to 20 carbon atoms, having a weight-average molecular weight of 600 to 3,500 and having less than 0.1 methyl branch, as measured by $^{13}$C-NMR, based on 1,000 carbon atoms.

This vinyl-terminated macromonomer has a weight-average molecular weight (Mw), as measured by gel permeation chromatography (GPC), of usually of 600 to 3,500, preferably 700 to 3,500, more preferably 800 to 3,500, and Mw/Mn (Mn: number-average molecular weight) of usually not less than 1.5 and less than 4.0, preferably not less than 1.8 and less than 3.8.

In the vinyl-terminated macromonomer, the number of methyl branches, as measured by $^{13}$C-NMR, is usually less than 0.1, preferably less than 0.08, more preferably less than 0.05, based on 1,000 carbon atoms.

The vinyl-terminated macromer can be prepared by copolymerizing ethylene and an olefin of 8 to 20 carbon atoms or polymerizing ethylene alone, using a catalyst containing, for example, the later-described transition metal compound (B).

This branched polyolefin has a weight-average molecular weight of usually 30,000 to 500,000, preferably 50,000 to 200,000, and MFR of usually 0.01 to 100 g/10 min, preferably 0.05 to 10 g/10 min.

Large Ea means that the temperature dependence of the viscosity of the branched polyolefin is great, and when a branched polyolefin having large Ea is molded by extrusion, extrusion molding can be easily performed because the viscosity of the polyolefin in the vicinity of the die is low, and when the molded product is then cooled, the viscosity rapidly rises. Hence, the molded product comes to be hardly stretched, and as a result, the product hardly suffers stretching nonuniformity.

The branched polyolefin according to the invention has low MT and thereby has good drawdown (high-speed take-off properties). Hence, if the polyolefin is taken off in a molten state at a high speed, breaking hardly occurs.

The third embodiment of the branched polyolefin according to the invention comprises:

(i) recurring units derived from at least one olefin selected from olefins of 2 to 20 carbon atoms, and (ii) recurring units derived from a vinyl-terminated macromonomer having a weight-average molecular weight of 600 to 200,000, preferably 1,000 to 100,000, and having less than 0.1 methyl branch, as measured by $^{13}$C-NMR, based on 1,000 carbon atoms.

The third embodiment of the branched polyolefin comprising the recurring units (i) and the recurring units (ii) is obtained by copolymerizing at least one olefin selected from olefins of 2 to 20 carbon atoms and the vinyl-terminated macromonomer.

Examples of the olefins of 2 to 20 carbon atoms include ethylene and the aforesaid olefins of 3 to 20 carbon atoms. Of these, an olefin selected from ethylene, propylene, 1-butene, 1-hexene, 1-octene and norbornene is preferable. These olefins of 2 to 20 carbon atoms can be used singly or in combination of two or more kinds.

The vinyl-terminated macromonomer is a (co)polymer mainly containing recurring units derived from ethylene, and in the vinyl-terminated macromonomer, recurring units derived from ethylene are desirably present in amounts of usually 50 to 100% by mol, preferably 55 to 100% by mol, more preferably 65 to 100% by mol, most preferably 70 to 100% by mol, and recurring units derived from an olefin of 4 to 20 carbon atoms are desirably present in amounts of 0 to 50% by mol, preferably 0 to 45% by mol, more preferably 0 to 35% by mol, particularly preferably 0 to 30% by mol.

Examples of the olefins of 4 to 20 carbon atoms include the aforesaid straight-chain or branched α-olefins and cycloolefins, except ethylene and propylene. Of these, an olefin selected from 1-butene, 1-hexene, 1-octene and norbornene is preferable.

The vinyl-terminated macromonomer has a weight-average molecular weight (Mw), as measured by gel permeation chromatography (GPC), of usually of 1,000 to 10,000, preferably 1,500 to 9,000, more preferably 2,000 to 8,000, still more preferably 2,500 to 7,000.

In the vinyl-terminated macromonomer, the number of methyl branches, as measured by $^{13}$C-NMR, is usually less than 0.1, preferably less than 0.08, more preferably less than 0.05, based on 1,000 carbon atoms.

The vinyl-terminated macromonomer has Mw/Mn (Mn: number-average molecular weight) of usually not less than 1.5 and less than 4.0, preferably not less than 1.8 and less than 3.8.

The vinyl-terminated macromonomer can be prepared by copolymerizing ethylene and an olefin of 4 to 20 carbon atoms or polymerizing ethylene alone, using a catalyst containing, for example, the later-described transition metal compound (B).

The branched polyolefin of the third embodiment is a polyolefin obtained by copolymerizing (i) at least one olefin selected from olefins of 2 to 20 carbon atoms and (ii) the above-mentioned vinyl-terminated macromonomer. This branched polyolefin has a weight-average molecular weight of usually 30,000 to 10,000,000, preferably 50,000 to 5,000,000, and Mw/Mn of usually 1.5 to 20, preferably 1.8 to 10, more preferably 2 to 4, and has usually 0.01 to 60 side chains, preferably 0.1 to 50 side chains, more preferably 1 to 40 side chains, still more preferably 6 to 30 side chains, based on 1,000 carbon atoms of main chain.

The branched polyolefin according to the invention is desired to be a polyolefin wherein the main chain is a (co)polymer of at least one olefin selected from olefins of 2 to 20 carbon atoms, preferably a (co)polymer essentially containing at least one olefin selected from olefins of 3 to 20 carbon atoms, and the side chain is an ethylene homopolymer.

Next, methods for measuring flow activation energy, α-olefin content, melt tension and melt flow rate are described.

Flow Activation Energy (Ea)

Using a Rheometrix Rheometer RDS-II, variance of an angular velocity ($\omega$ (rad/sec)) of a storage elastic modulus (G' (dyne/cm$^2$)) was measured. As a sample holder, parallel plates of 25 mm diameter were used, and the sample thickness was about 2 mm. The measuring temperatures were 140, 170, 200 and 230° C., and at each temperature, G' was measured in the range of $0.04 \leq \omega \leq 400$. The measuring points were 5 points based on one figure of $\omega$. The strain was appropriately selected from the range of 2 to 25% so that the torque can be detected in the measuring range and no torque-over occurs. After the measurement, flow curves obtained under four temperature conditions were overlapped (reference temperature: 140° C.), and Ea was determined from the Arrhenius type plot of the shift factor. Calculation was performed by plotting with a Microsoft tabular calculation software excel™. First, the data measured at the four measuring temperatures were plotted as both logarithmic values, with $\omega$ as abscissa and G' as ordinate. Flow curves other than the flow curve of the measuring temperature of 140° C. were shifted along the ordinate so that they overlap the flow curve of the measuring temperature of 140° C., and the shift quantity is taken as log(aT). To the reciprocal number of the measuring temperature (true measuring temperature being described as absolute temperature), log (aT) was plotted, and an inclination was determined by the method of least squares (linear approximation). When the correlation coefficient R2 was 0.995 or less, shifting of the flow curves was done over again. The inclination is taken as A.

$Ea$ (KJ/mol)=2.303×8.314×$A$×(-1)/1000 wherein 2.303 is ln10, and 8.314 is a gas constant.

If a long branch is present, overlapping in the region of low ω is sometimes bad. In this case, the flow curve was shifted so as to overlap in the region of high ω of about ω≧10 rad/sec.

α-Olefin Content

The α-olefin content was determined by $^{13}$C-NMR.

Melt Tension (MT)

The melt tension was determined by measuring a stress given when a molten polymer was stretched at a constant rate. That is, granulation pellets of a copolymer were used as a measuring sample, and the measurement was carried out using a MT measuring machine manufactured by Toyo Seiki Seisakusho under the conditions of a resin temperature of 190° C., a barrel diameter of 9.55 mm, an extrusion speed of 15 mm/min, a take-up rate of 10 to 20 m/min, a nozzle diameter of 2.095 mm and a nozzle length of 8 mm.

When the MT value was less than about 4, the full-scale range was set to 5 g, and in this case, the MT value was expressed by a value down to the second decimal place. When the MT value was in the range of about 4 to 9, the full-scale range was set to 10 g, and in this case, the MT value was expressed by a value down to the first decimal place. When the MT value was in the range of about 9 to 18, the full-scale range was set to 20 g, and in this case, the MT value was expressed by a value down to the first decimal place.

Melt Flow Rate (MFR)

The melt flow rate was measured in accordance with ASTM D-1238 under the conditions of a temperature of 190° C. and a load of 2.16 kg.

Number-average Molecular Weight (Mn), Weight-average Molecular Weight (Mw), Mw/Mn The molecular weight was measured in the following manner using Waters GPC-150C. Separatory columns of TSKgel GMH6-HT and TSKgel GMH6-HTL each having an inner diameter of 7.5 mm and a length of 600 mm were used, and the column temperature was 140° C. Using o-dichlorobenzene (available from Wako Junyaku Kogyo) as a mobile phase and 0.025% by weight of BHT (available from Takeda Chemical Industries, Ltd.) as an antioxidant, a sample (concentration: 0.1% by weight, pour: 500 microliter) was moved at a rate of 1.0 ml/min. As a detector, a differential refractometer was used. As standard polystyrene, polystyrene of Mw<1000 and Mw>4×10$^6$ available from Tohso Co. and polystyrene of 1000≦Mw≦4×10$^6$ available from Pressure Chemical Co. were used. In the calculation of molecular weight, universal calibration was made, and the obtained value is a value in terms of PE.

The peak separation was carried out by the following manner using a Toso analytical apparatus SC8010. A minimum point between peaks was determined from the chart. From the point, a perpendicular was drawn toward the base line, and Mw, Mn, Mw/Mn and peak intensity ratio at each peak were calculated.

Measurements of the Number of Methyl Branches and the Number of Hexyl Branches

The number of methyl branches based on 1,000 carbon atoms in the polymer molecular chain was measured by $^{13}$C-NMR. In the measurement, a Japan Electron Optics Laboratory Lambda 500 type nuclear magnetic resonance apparatus ($^1$H: 500 MHz) was used. The number of integration times was 10,000 to 30,000. As the chemical shift base, a peak (29.97 ppm) of the main chain methylene was used. The measurement was made by placing 250 to 400 mg of a sample and 3 ml of a mixed liquid of o-dichlorobenzene of special grade available from Wako Junyaku Kogyo K. K. and benzene-d6 available from ISOTEC Co. (5:1, by volume) in a commercially available NMR measuring quarts glass tube of 10 mm diameter and heating them at 120° C. to give a homogeneous dispersion. Assignment of each absorption in the NMR spectrum was carried out in accordance with *Region of Chemistry*, extra issue No. 141, NMR-Outline And Experimental Guide (I), pp. 132–133. The number of methyl branches based on 1,000 carbon atoms is calculated from a ratio of the integral intensity of absorption (19.99 ppm) of a methyl group derived from methyl branch to the integral total sum of absorptions appearing in the region of 5 to 45 ppm. The number of hexyl (or longer) branches based on 1,000 carbon atoms is calculated from a ratio of the integral intensity of methylene (C6+3) appearing at 32.2 ppm to the integral total sum thereof.

Preparation

The branched polyolefin according to the invention can be prepared by the use of, for example, an olefin polymerization catalyst comprising:

(A) a transition metal compound containing a ligand having cyclopentadienyl skeleton, (B) a transition metal compound represented by the following formula (I):

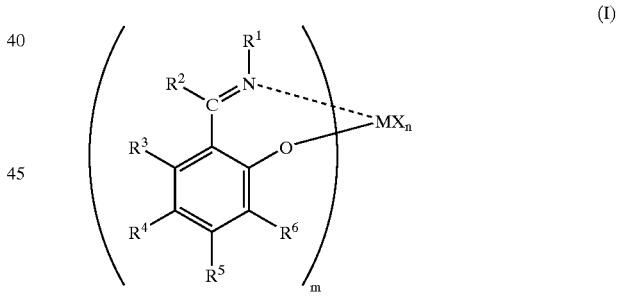

and (C) at least one compound selected from:
(C-1) an organometallic compound,
(C-2) an organoaluminum oxy-compound, and
(C-3) a compound which reacts with the transition metal compound (A) or the transition metal compound (B) to form an ion pair.

The components for forming the olefin polymerization catalyst employable for the preparation of the branched polyolefin are described below.

(A) Transition Metal Compound Containing Ligand Having Cyclopentadienyl Skeleton Although the transition metal compound (A) containing a ligand having cyclopentadienyl skeleton, which is used for forming the olefin polymerization catalyst, is not specifically restricted, a metallocene compound per se publicly known is available. Examples of such compounds include metallocene compounds of transition metals such as titanium, vanadium, chromium, zirconium and hafnium, and any of compounds which are liquid or solid under the use conditions is employable. The transition metal compound may be a single compound, may be supported on another compound, may be a homogeneous mixture with another compound, or may be a complex or double compound with another compound.

Of the metallocene compounds per se publicly known, a metallocene compound of chiral structure having C2 symmetry or C1 symmetry is preferably used in the present invention.

Preferred examples of the metallocene compounds of chiral structure having C2 symmetry include
rac-ethylene-bis(indenyl)zirconium dichloride,
rac-ethylene-bis(tetrahydroindenyl)zirconium dichloride,
rac-dimethylsilylene-bis(2,3,5-trimethylcyclopentadienyl) zirconium dichloride,
rac-dimethylsilylene-bis[1-(4-phenylindenyl)]zirconium dichloride,
rac-dimethylsilylene-bis[1-(2-methyl-4-phenylindenyl)]zirconium dichloride,
rac-dimethylsilylene-bis{1-[2-methyl-4-(1-naphthyl)indenyl]}zirconium dichloride,
rac-dimethylsilyiene-bis{1-[2-methyl-4-(2-naphthyl)indenyl]}zirconium dichloride,
rac-dimethylsilylene-bis{1-[2-methyl-4-(1-anthryl)-indenyl]}zirconium dichloride,
rac-dimethylsilylene-bis{1-[2-methyl-4-(9-anthryl)-indenyl]}zirconium dichloride,
rac-dimethylsilyiene-bis{1-[2-methyl-4-(9-phenanthryl)indenyl]}zirconium dichloride,
rac-dimethylsilylene-bis{1-[2-methyl-4-(o-chlorophenyl) indenyl]}zirconium dichloride,
rac-dimethylsilylene-bis{1-[2-methyl-4-(pentafluorophenyl)indenyl]}zirconium dichloride,
rac-dimethylsilylene-bis[1-(2-ethyl-4-phenylindenyl)]zirconium dichloride,
rac-dimethylsilylene-bis{1-[2-ethyl-4-(1-naphthyl)-indenyl]}zirconium dichloride,
rac-dimethylsilylene-bis{1-[2-ethyl-4-(9-phenanthryl)indenyl]}zirconium dichloride,
rac-dimethylsilylene-bis[1-(2-n-propyl-4-phenylindenyl)] zirconium dichloride,
rac-dimethylsilylene-bis{1-[2-n-propyl-4-(1-naphthyl)indenyl]}zirconium dichloride and
rac-dimethylsilylene-bis{1-[2 n-propyl-4-(9-phenanthryl) indenyl]}zirconium dichloride.

Preferred examples of the metallocene compounds of chiral structure having C1 symmetry include
ethylene[2-methyl-4-(9-phenanthryl)-1-indenyl](9-fluorenyl)zirconium dichloride,
ethylene[2-methyl-4-(9-phenanthryl)-1-indenyl](2,7-dimethyl-9-fluorenyl)zirconium dichloride,
dimethylsilylene(9-fluorenyl)(3-t-butylcyclopentadienyl) zirconium dichloride and
diphenylsilylene(9-fluorenyl)(3-t-butylcyclopentadienyl) zirconium dichloride.

Of the hitherto known metallocene compounds, metallocene compounds having only one substituted cyclopentadienyl group are also employable as the metallocene compounds preferably used in the invention.

For example, there can be mentioned (tertiarybutylamido)(tetramethyl-$\eta^5$-cyclopentadienyl)-1,2-ethane diylzirconium dichloride,
(tertiarybutylamido)(tetramethyl-$\eta^5$-cyclopentadienyl)-1,2-ethanediyltitanium dichloride,
(methylamido)(tetramethyl-$\eta^5$-cyclopentadienyl)-1,2-ethanediylzirconium dichloride,
(methylamido)(tetramethyl-$\eta^5$-cyclopentadienyl)-1,2-ethanediyltitanium dichloride,
(ethylamido)(tetramethyl-$\eta^5$-cyclopentadienyl)-1,2-ethanediylzirconium dichloride,
(ethylamido)(tetramethyl-$\eta^5$-cyclopentadienyl)-1,2-ethanediyltitanium dichloride,
(tertiarybutylamido)dimethyl(tetramethyl-$\eta^5$-cyclopentadienyl)silanetitanium dichloride,
(tertiarybutylamido)dimethyl(tetramethyl-$\eta^5$-cyclopentadienyl)silanezirconium dibenzyl,
(benzylamido)dimethyl(tetramethyl-$\eta^5$-cyclopentadienyl) silanetitanium dichloride and
(phenylphosphido)dimethyl(tetramethyl-$\eta^5$-cyclopentadienyl)silanezirconium dibenzyl.

Of the hitherto known metallocene compounds, metallocene compounds having two substituted cyclopentadienyl groups which are not bridged are also employable as the metallocene compounds preferably used in the invention.

For example, there can be mentioned
bis(methylcyclopentadienyl)zirconium dichloride,
bis(dimethylcyclopentadienyl)zirconium dichloride,
bis(dimethylcyclopentadienyl)zirconium ethoxychloride,
bis(dimethylcyclopentadienyl)zirconium bis(trifluoro-methanesulfonato),
bis(ethylcyclopentadienyl)zirconium dichloride,
bis(propylcyclopentadienyl)zirconium dichloride,
bis(methylpropylcyclopentadienyl)zirconium dichloride,
bis(butylcyclopentadienyl)zirconium dichloride,
bis(methylbutylcyclopentadienyl)zirconium dichloride,
bis(methylbutylcyclopentadienyl)zirconium bis(trifluoro-methanesulfonato),
bis(trimethylcyclopentadienyl)zirconium dichloride,
bis(tetramethylcyclopentadienyl)zirconium dichloride,
bis(pentamethylcyclopentadienyl)zirconium dichloride,
bis(hexylcyclopentadienyl)zirconium dichloride and
bis(trimethylsilylcyclopentadienyl)zirconium dichloride.

Of the above metallocene compounds, more preferable are metallocene compounds having only one substituted cyclopentadienyl group, and particularly preferable are metallocene compounds having only one substituted cyclopentadienyl group and containing titanium as the central metal.

The transition metal compounds (A) mentioned above can be used singly or in combination or two or more kinds.

(B) Transition Metal Compound

The transition metal compound (B) for forming the olefin polymerization catalyst is a compound represented by the following formula (I):

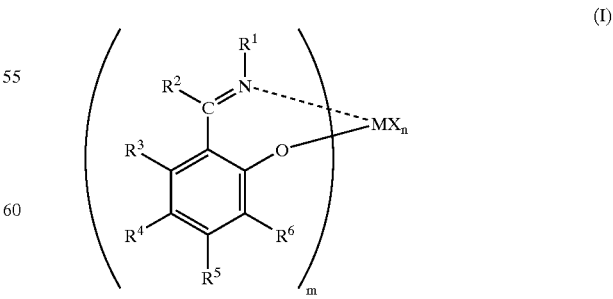

(I)

wherein N - - - M generally indicates coordination, but in the present invention, they do not need to be coordinated.

In the formula (I), M is a transition metal atom of Group 4 or Group 5 of the periodic table, such as titanium, zirconium, hafnium, vanadium, niobium or tantalum, preferably a metal atom of Group 4 of the periodic table, such as titanium, zirconium or hafnium, more preferably zirconium.

m is an integer of 1 to 2, preferably 2.

$R^1$ is an aliphatic or alicyclic hydrocarbon group.

Examples of the hydrocarbon groups include:

aliphatic hydrocarbon groups of 1 to 30 carbon atoms, such as methyl, ethyl, n-propyl, isopropyl, n-butyl, isobutyl, sec-butyl, tert-butyl, n-pentyl, tert-amyl, 1,2-dimethylpropyl, 1-ethylpropyl, isoamyl, 1-methylbutyl, 2-methylbutyl, neopentyl, n-hexyl, 1,3-dimethylbutyl, 3,3-dimethylbutyl, n-heptyl, 1-ethylpentyl, 1-methylhexyl, n-octyl, 1,5-dimethylhexyl, 2-ethylhexyl, 1-methylheptyl, tert-octyl, n-nonyl, n-decyl, n-undecyl, n-dodecyl, n-tridecyl, n-tetradecyl, n-pentadecyl, n-hexadecyl, n-heptadecyl and n-octadecyl; and alicyclic hydrocarbon groups of 3 to 30 carbon atoms, such as cyclopropyl, cyclobutyl, cyclopentyl, cyclohexyl, 2-methylcyclohexyl, 2,2-dimethylcyclohexyl, 2,6-dimethylcyclohexyl, 2,2,6,6-tetramethylcyclohexyl, adamantyl, cyclopropylmethyl, cyclobutylmethyl, cyclopentylmethyl and cyclohexylmethyl.

$R^1$ is preferably an aliphatic or alicyclic hydrocarbon group represented by $CH_2R'$ or an alicyclic hydrocarbon group containing a carbon atom bonded to the N atom as a part of the alicyclic skeleton, and is particularly preferably an aliphatic or alicyclic hydrocarbon group represented by $CH_2R'$.

R' is an aliphatic or alicyclic hydrocarbon group, and examples thereof include aliphatic hydrocarbon groups of 1 to 29 carbon atoms, such as methyl, ethyl, n-propyl, isopropyl, n-butyl, 2-methylpropyl, isobutyl, n-pentyl, neopentyl, n-hexyl, n-heptyl, 1-ethylpentyl, n-octyl, n-nonyl, n-decyl, n-undecyl, n dodecyl, n-tridecyl, n-tetradecyl, n-pentadecyl, n-hexadecyl and n-heptadecyl; and alicyclic hydrocarbon groups of 3 to 29 carbon atoms, such as cyclopropyl, cyclobutyl, cyclopentyl and cyclohexyl. Of these, preferable as R' is a straight-chain aliphatic hydrocarbon group of 1 to 17 carbon atoms.

Preferred examples of the alicyclic hydrocarbon groups containing a carbon atom bonded to the N atom as a part of the alicyclic skeleton include cyclopropyl, cyclobutyl, cyclopentyl, cyclohexyl, 2-methylcyclohexyl, 2,2-dimethylcyclohexyl, 2,6-dimethylcyclohexyl, 2,2,6,6-tetramethylcyclohexyl and adamantyl. Of these, cyclohexyl is more preferable.

$R^2$ to $R^5$ may be the same or different and are each a hydrocarbon group, a hydrogen atom, a hydrocarbon-substituted silyl group, an oxygen-containing group, a nitrogen-containing group or a sulfur-containing group.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atom, such as phenyl, benzyl, naphthyl, biphenylyl, terphenylyl, phenanthryl and anthryl; and alkyl-substituted aryl groups, such as tolyl, isopropylphenyl, t-butylphenyl, dimethylphenyl and di-t-butylphenyl.

In the above hydrocarbon groups, the hydrogen atom may be replaced with a halogen, and examples of the hydrocarbon groups in which the hydrogen atom is replaced with a halogen include halogenated hydrocarbon groups of 1 to 30 carbon atoms, preferably 1 to 20 carbon atoms, such as trifluoromethyl, pentafluorophenyl and chlorophenyl.

The above hydrocarbon groups maybe substituted with other hydrocarbon groups, and examples of such hydrocarbon groups include aryl-substituted hydrocarbon groups, such as benzyl and cumyl.

Of the above groups, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, t-butyl, neopentyl and n-hexyl; aryl groups of 6 to 30 carbon atoms, preferably 6 to 20 carbon atom, such as phenyl, naphthyl, biphenylyl, terphenylyl, phenanthryl and anthryl; and substituted aryl groups wherein the above aryl groups are substituted with 1 to 5 substituents such as halogen atoms, alkyl groups of 1 to 30 carbon atoms, preferably 1 to 20 carbon atoms, alkoxy groups of 1 to 30 carbon atoms, preferably 1 to 20 carbon atoms, aryl groups of 6 to 30 carbon atoms, preferably 6 to 20 carbon atoms or aryloxy groups of 6 to 30 carbon atoms, preferably 6 to 20 carbon atoms.

Examples of the hydrocarbon-substituted silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl (pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl, and particularly preferable are trimethylsilyl, triethylsilyl, triphenylsilyl and dimethylphenylsilyl.

The oxygen-containing group is a group containing 1 to 5 oxygen atoms, and does not include the later-described heterocyclic compound residue. Examples of the oxygen-containing groups include hydroxyl group; alkoxy groups, such as methoxy, ethoxy, n-propoxy, isopropoxy, n-butoxy, isobutoxy and tert-butoxy; aryloxy groups, such as phenoxy, methylphenoxy, 2,6-dimethylphenoxy, 2,4,6-trimethylphenoxy and naphthoxy; arylalkoxy groups, such as phenylmethoxy and phenylethoxy; acetoxy group; and carbonyl group.

The nitrogen-containing group is a group containing 1 to 5 nitrogen atoms, and does not include the later-described heterocyclic compound residue. Examples of the nitrogen-containing groups include amino groups, such as methylamino, dimethylamino, diethylamino, dipropylamino, dibutylamino, dicyclohexylamino, phenylamino, diphenylamino, ditolylamino, dinaphthylamino and methylphenylamino; imino groups, such as methylimino, ethylimino, propylimino, butylimino and phenylimino; amido groups, such as acetamido, N-methylacetamido and N-methylbenzamido; imido groups, such as acetimido and benzimido; and nitro group.

The sulfur-containing group is a group containing 1 to 5 sulfur atoms, and does not include the later-described heterocyclic compound residue. Examples of the sulfur-containing groups include sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups, such as methylthio and ethylthio; and arylthio groups, such as phenylthio, methylphenylthio and naphthylthio.

$R^6$ is a hydrocarbon group or a hydrocarbon-substituted silyl group.

Examples of the hydrocarbon groups preferable as $R^6$ include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atom, such as phenyl, benzyl, naphthyl, biphenylyl and triphenylyl; and groups wherein the above groups are further substituted with substituents such as alkyl groups of 1 to 30 carbon atoms, preferably 1 to 20 carbon atoms, or aryl groups of 6 to 30 carbon atoms, preferably 6 to 20 carbon atoms.

Examples of the hydrocarbon-substituted silyl groups preferable as $R^6$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-t-butylsilyl and dimethyl(pentafluorophenyl)silyl. Of these, particularly preferable are trimethylsilyl, triethylphenyl, diphenylmethylsilyl, isophenylsilyl, dimethylphenylsilyl, dimethyl-tert-butylsilyl and dimethyl(pentafluorophenyl)silyl.

In the present invention, $R^6$ is particularly preferably a branched alkyl group of 3 to 30 carbon atoms, preferably 3 to 20 carbon atoms, such as isopropyl, isobutyl, sec-butyl, tert-butyl or neopentyl, a group wherein the hydrogen atom of the above branched alkyl group is replaced with an aryl group of 6 to 30 carbon atoms, preferably 6 to 20 carbon atoms, such as cumyl, or a cyclic saturated hydrocarbon group of 3 to 30 carbon atoms, preferably 3 to 20 carbon atoms, such as adamantyl, cyclopropyl, cyclobutyl, cyclopentyl or cyclohexyl; and is also particularly preferably an aryl group of 6 to 30 carbon atoms, preferably 6 to 20 carbon atoms, such as phenyl, naphthyl, fluorenyl, anthranyl or phenanthryl, or a hydrocarbon-substituted silyl group.

Two or more groups of $R^1$ to $R^6$, preferably neighboring groups thereof, may he bonded to form an aliphatic ring, an aromatic ring or a hydrocarbon ring containing a hetero atom such as a nitrogen atom, and these rings may further has a substituent.

n is a number satisfying a valence of M, specifically an integer of 2 to 4, preferably 2.

X is a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group, and when n is 2 or greater, plural groups indicated by X may be the same or different, and plural groups indicated by X may be bonded to form a ring.

The halogen atom is fluorine, chlorine, bromine or iodine.

Examples of the hydrocarbon groups include the same groups as previously exemplified with respect to $R^1$ to $R^6$. More specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. These hydrocarbon groups include halogenated hydrocarbon groups such as groups wherein at least one hydrogen of hydrocarbon groups of 1 to 20 carbon atoms is replaced with a halogen.

The oxygen-containing group is a group containing 1 to 5 oxygen atoms, and does not include the later-described heterocyclic compound residue. Examples of the oxygen-containing groups include hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; acetoxy group; and carbonyl group.

The sulfur-containing group is a group containing 1 to 5 sulfur atoms, and does not include the later-described heterocyclic compound residue. Examples of the sulfur-containing groups include sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; alkylthio groups; and arylthio groups.

The nitrogen-containing group is a group containing 1 to 5 nitrogen atoms, and does not include the later-described heterocyclic compound residue. Examples of the nitrogen-containing groups include amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

The boron-containing group is a group containing 1 to 5 boron atoms, and does not include the later-described heterocyclic compound residue. The boron-containing group is, for example, $BR_4$ (R is hydrogen, an alkyl group, an aryl group which may have a substituent, a halogen atom or the like).

The aluminum-containing group is, for example, $AlR_4$ (R is hydrogen, an alkyl group, an aryl group which may have a substituent, a halogen atom or the like).

The phosphorus-containing group is a group containing 1 to 5 phosphorus atoms, and does not include the later-described heterocyclic compound residue. Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as melhylphosphite, ethylphosphite and phenylphosphite; phosphonic acid group; and phosphinic acid group.

Examples of the halogen-containing groups include fluorine-containing groups, such as $PF_6$ and $BF_4$; chlorine-containing groups, such as $ClO_4$ and $SbCl_6$; and iodine-containing groups, such as $IO_4$.

The heterocyclic compound residue is a group having a cyclic structure containing one or more hetero atoms. Examples of the hetero atoms include oxygen, nitrogen, sulfur, phosphorus and boron. Examples of the cyclic structures include 3- to 18-membered rings. Of these, preferable are 4- to 7-membered rings, and more preferable are 5- to 6-membered rings. Examples of the heterocyclic compound residues include residues of nitrogen-containing compounds such as pyrrole, pyridine, pyrimidine, quinoline and triazine, oxygen-containing compounds such as furan and pyran, and sulfur-containing compounds such as thiophene, and groups wherein these heterocyclic compound residues are further substituted with substituents such as alkyl groups of 1 to 30 carbon atoms, preferably 1 to 20 carbon atoms, or alkoxy groups.

Examples of the silicon-containing groups include hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include groups wherein silicon is replaced with germanium in the above-mentioned silicon-containing groups.

Examples of the tin-containing groups include groups wherein silicon is replaced with tin in the above-mentioned silicon-containing groups.

Examples of the transition metal compounds represented by the formula (I) are given below, but the transition metal compounds are not limited thereto.

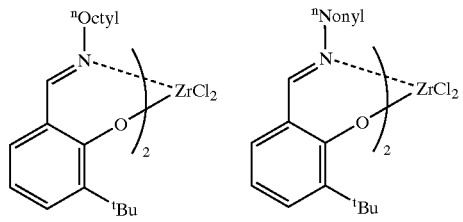

-continued

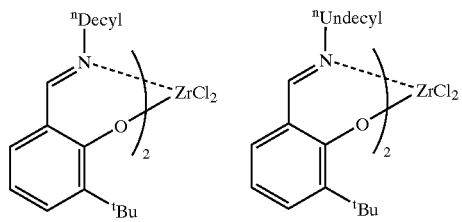

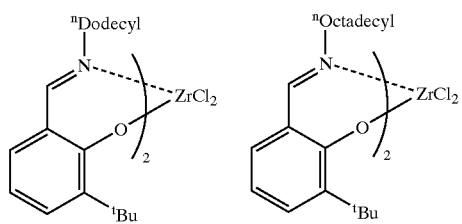

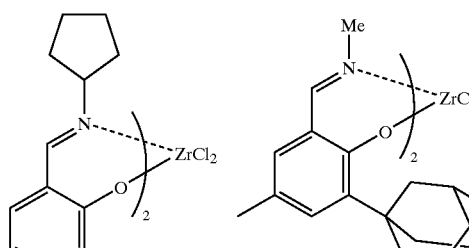

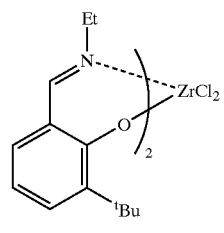

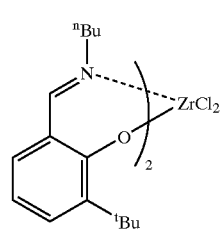

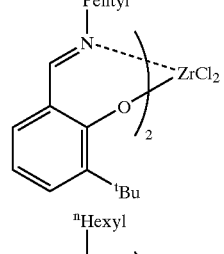

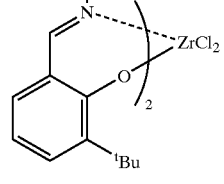

-continued
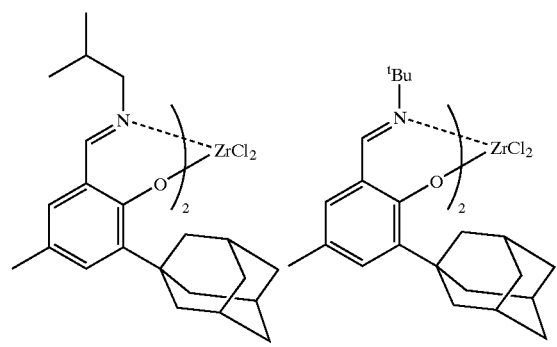
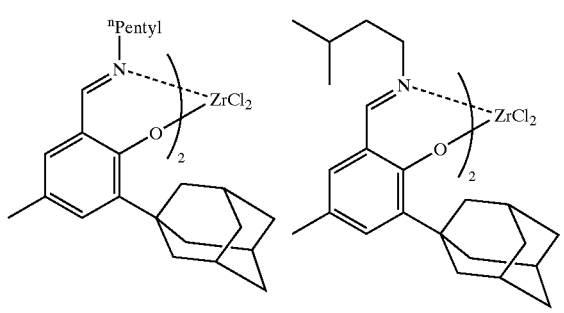
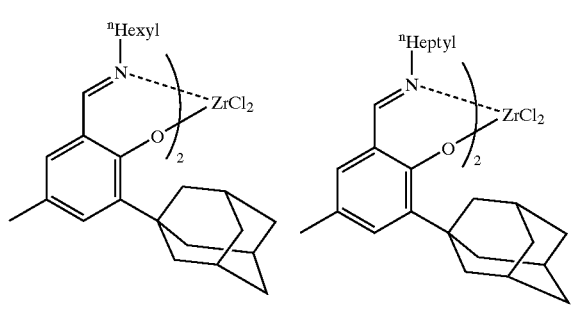
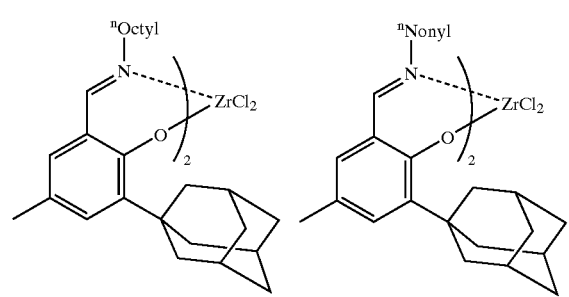
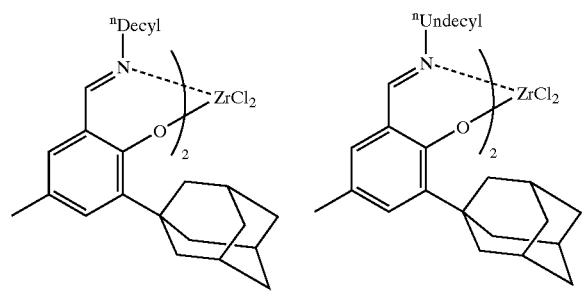
-continued
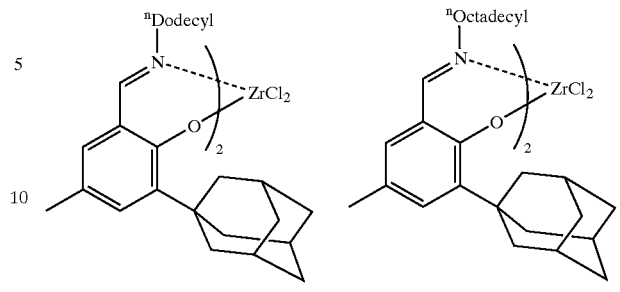
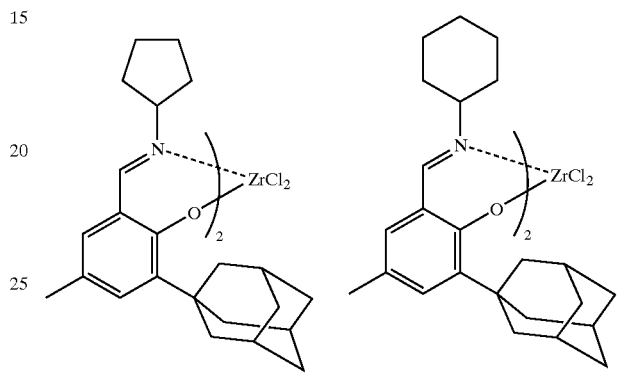
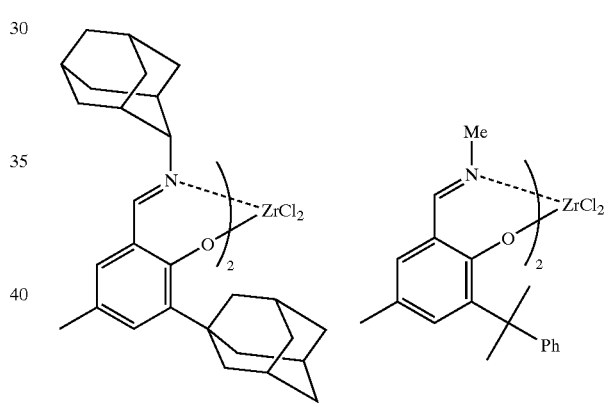
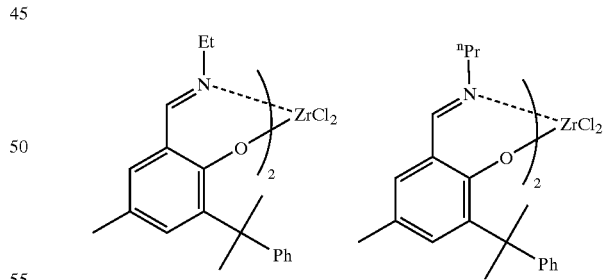
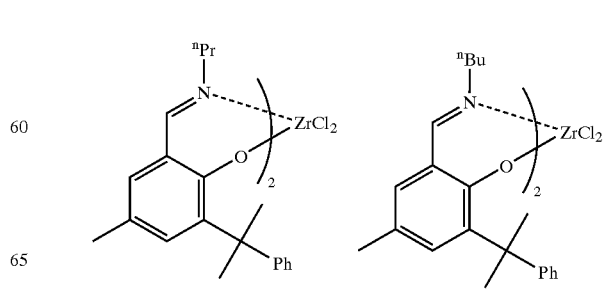

-continued
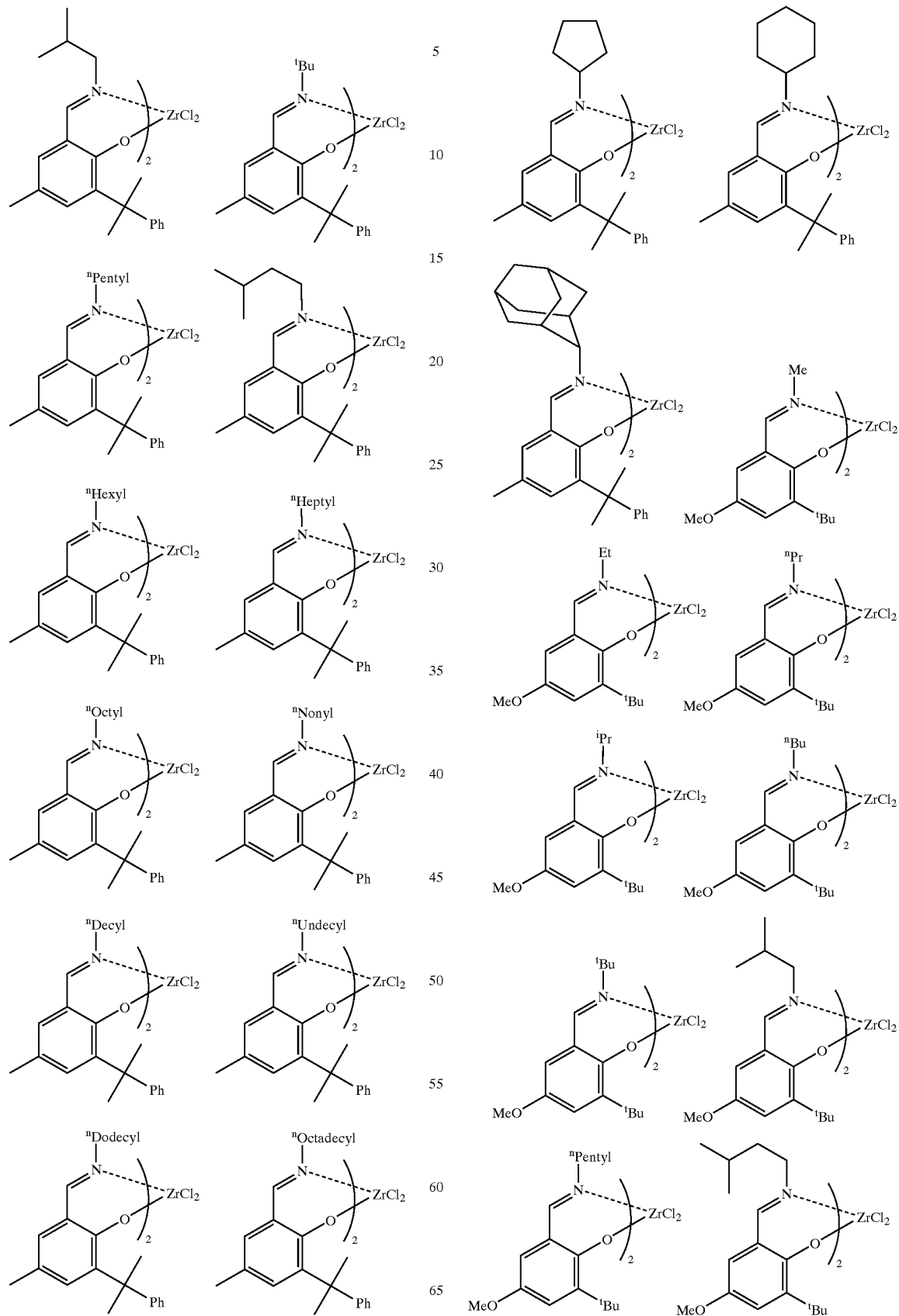

-continued
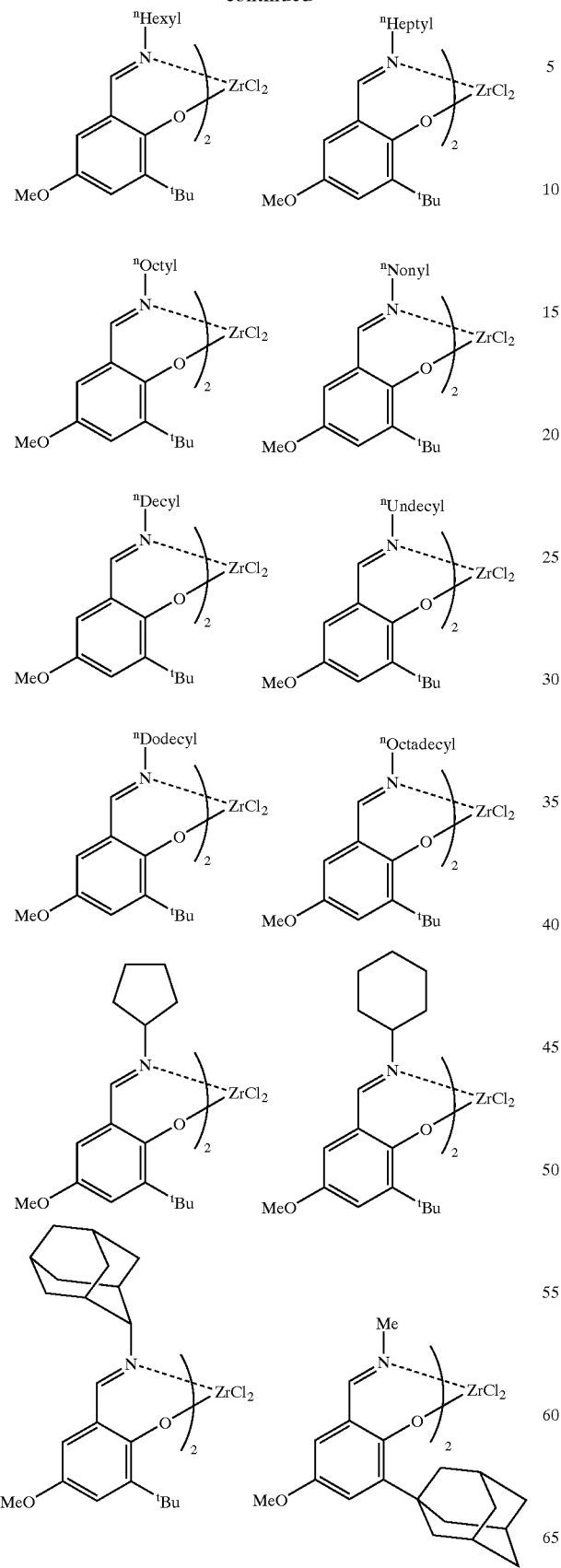
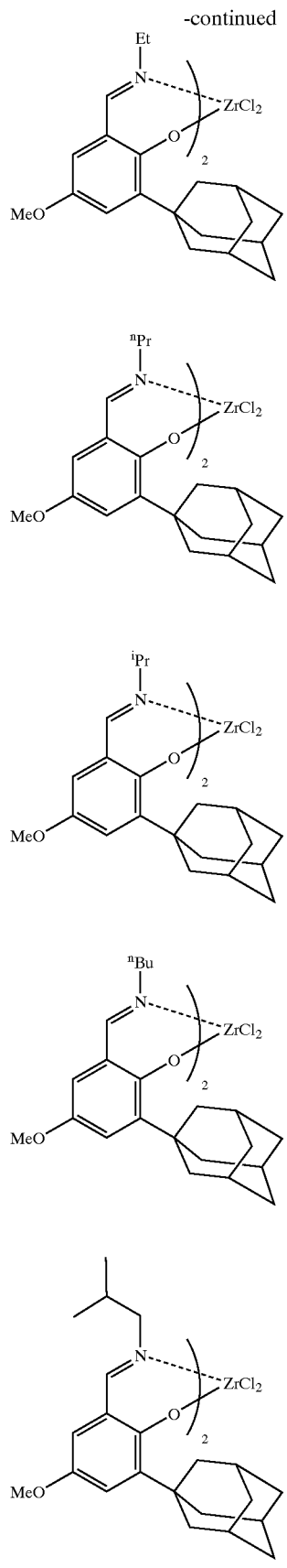

-continued
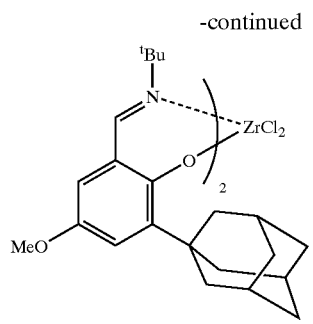
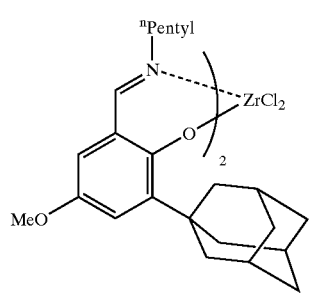
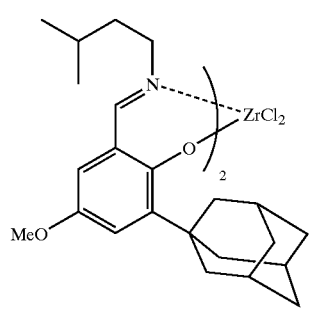
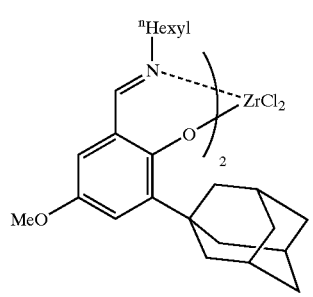
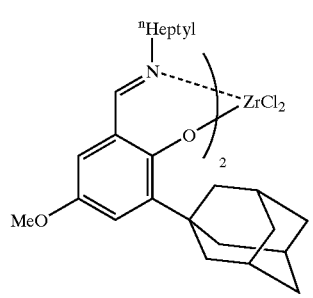
-continued
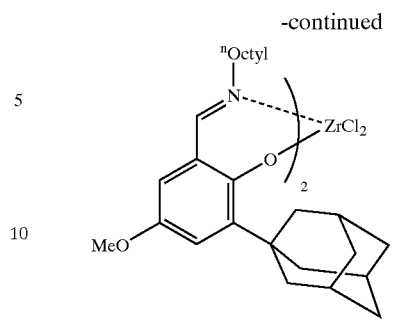
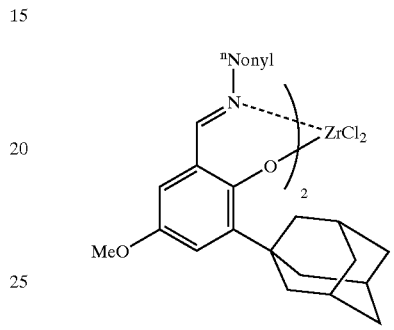
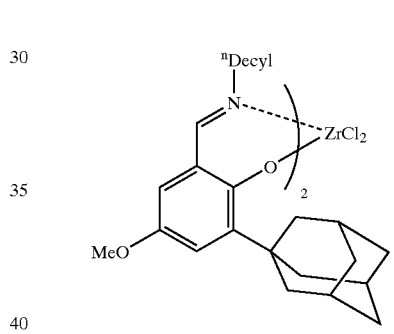
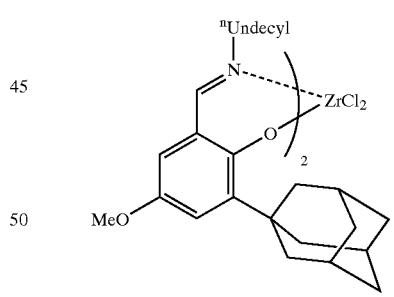
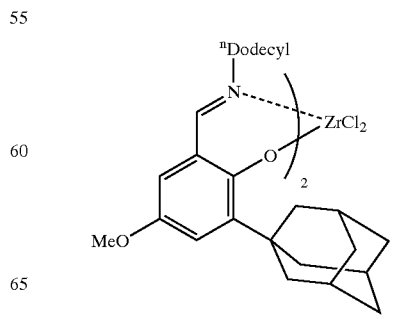

-continued
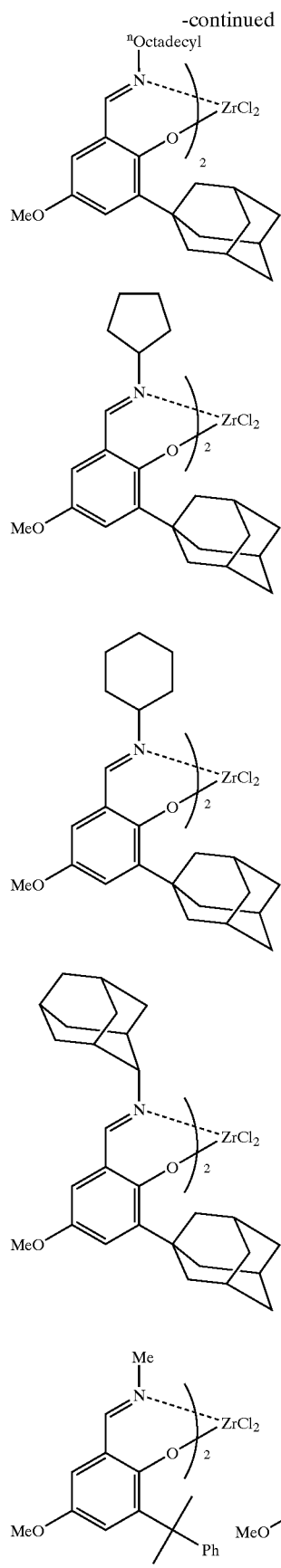
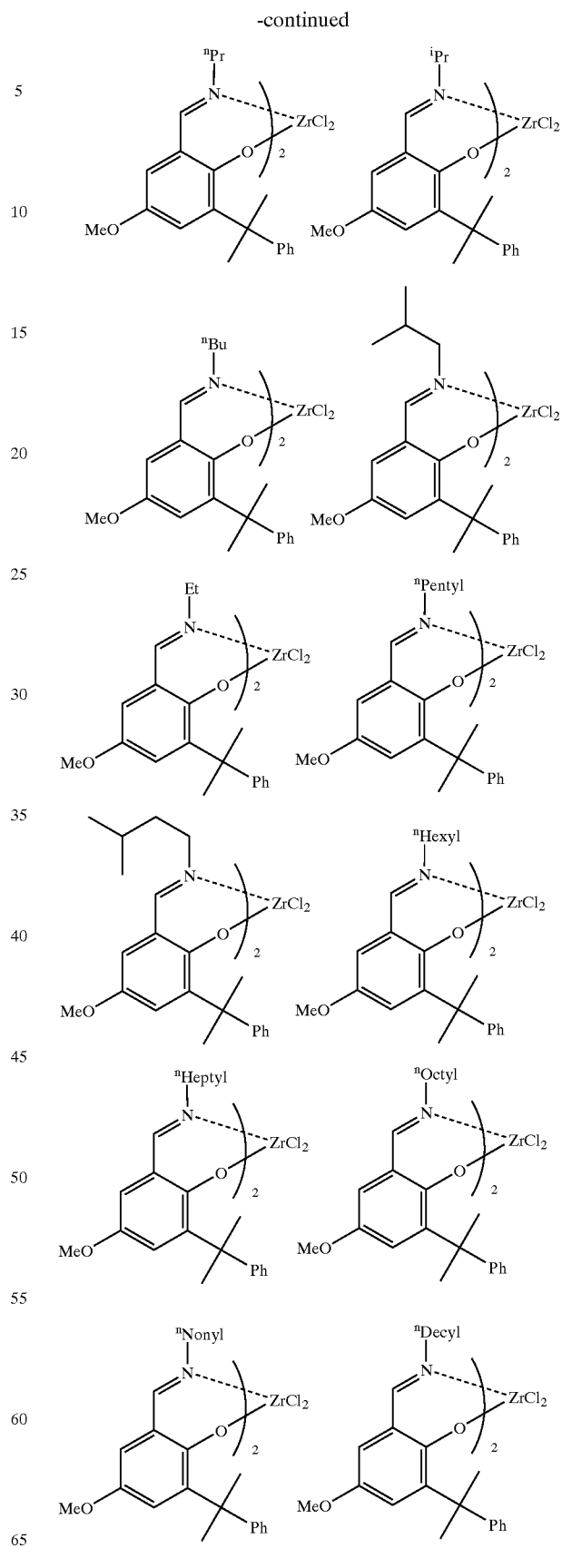

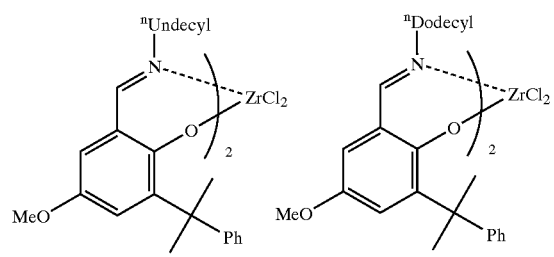
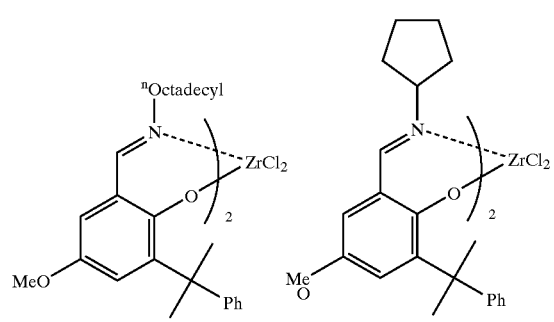
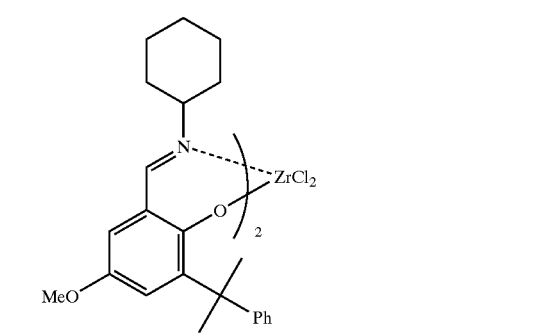
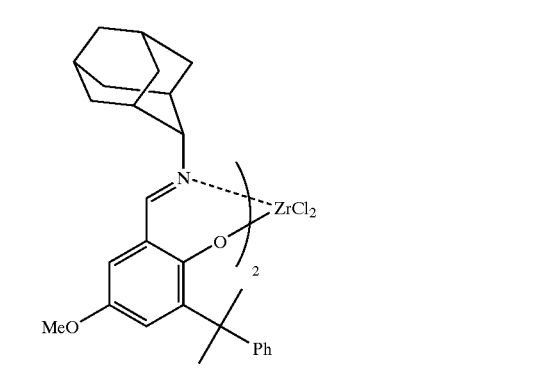
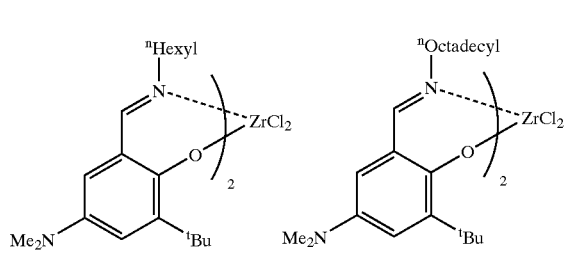
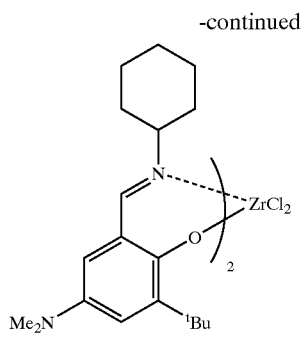
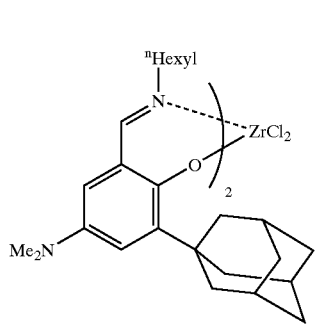
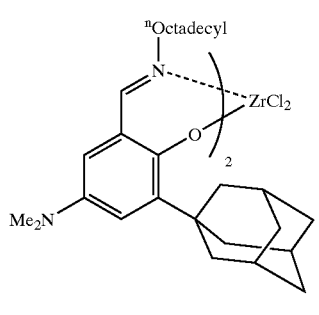
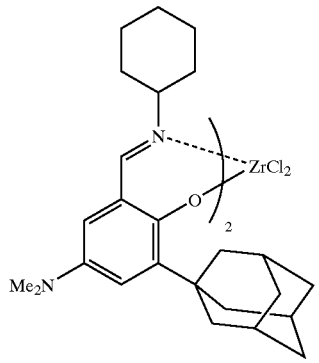
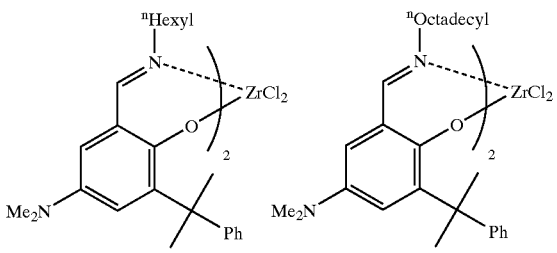

-continued
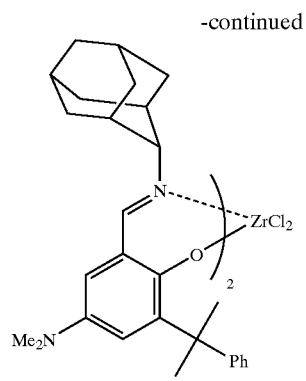
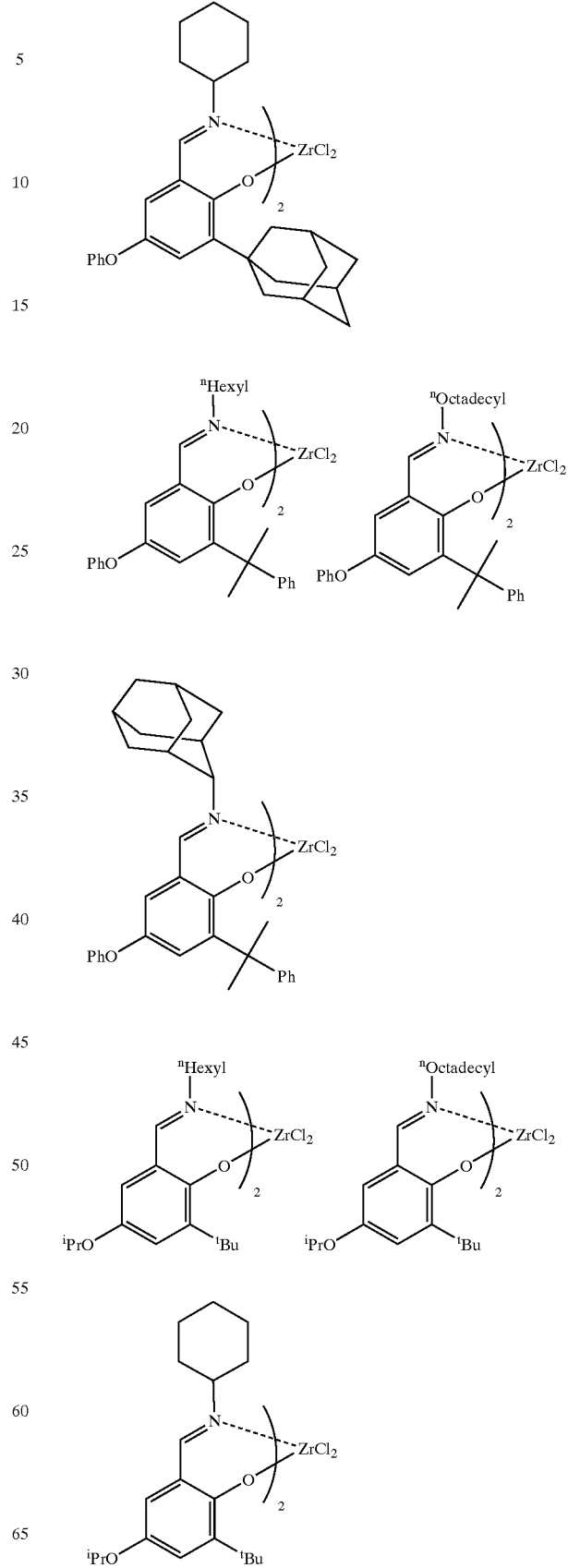

-continued

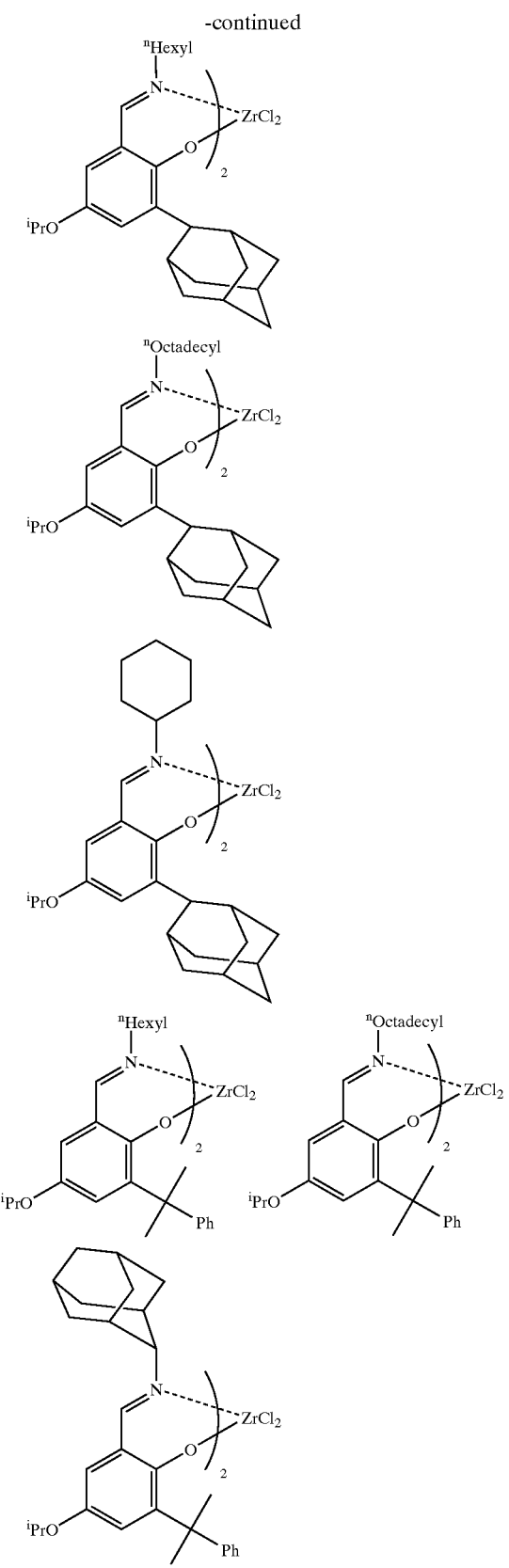

In the above examples, Me denotes a methyl group, Et denotes an ethyl group, nPr denotes a n-propyl group, iPr denotes an isopropyl group, nBu denotes a n-butyl group, tBu denotes a t-butyl group, nPentyl denotes a n-pentyl group, nHexyl denotes a n-hexyl group, nHeptyl denotes a n-heptyl group, nOctyl denotes a n-Octyl group, nNonyl denotes a n-nonyl group, nDecyl denotes a n-decyl group, nUndecyl denotes a n-undecyl group, nDodecyl denotes a n-dodecyl group, nOctadecyl denotes a n-octadecyl group, and Ph denotes a phenyl group.

Also employable are transition metal compounds wherein the zirconium atom is replaced with a metal other than zirconium, such as titanium or hafnium, in the above compounds.

The process for preparing the transition metal compound (B) represented by the formula (I) is not specifically restricted, and the transition metal compound (B) can be prepared by, for example, the following process.

First, a compound (referred to as a "ligand precursor" hereinafter) which becomes a ligand in the resulting transition metal compound represented by the formula (I) is obtained by reacting a salicylaldehyde compound with a primary amine compound of the formula $R^1$—$NH_2$ ($R^1$ has the same meaning as in the formula (I)), such as an aniline compound or an alkylamine compound.

More specifically, both of the compounds are dissolved in a solvent. As the solvent, any solvent usually used for such reaction is employable, and particularly, an alcohol solvent such as methanol or ethanol or a hydrocarbon solvent such as toluene is preferable. Then, the resulting solution is stirred for about 1 to 48 hours at room temperature or under reflux, whereby the corresponding ligand precursor is obtained in excellent yield.

In the synthesis of the ligand precursor, an acid catalyst, such as formic acid, acetic acid or toluenesulfonic acid, may be used as the catalyst. The reaction can be effectively promoted by the use of molecular sieves, magnesium sulfate or sodium sulfate as a dehydrating agent or by conducting dehydration through the Dien and Stark method.

Then, the ligand precursor obtained as above is reacted with a metallic compound represented by $MX_k$ (M and X have the same meanings as those of M and X in the formula (I), and K is a number satisfying a valance of M), whereby the corresponding transition metal compound can be synthesized.

More specifically, the synthesized ligand precursor is dissolved in a solvent and if necessary contacted with a base to prepare a phenoxide salt, then the solution or the salt is mixed with a metallic compound such as a metallic halide or a metallic alkylate, and the mixture is stirred for about 1 to 48 hours at a temperature of −78° C. to room temperature or under reflux. As the solvent, any solvent usually used for such reaction is employable, and particularly, a polar solvent such as ether or tetrahydrofuran (THF) or a hydrocarbon solvent such as toluene is preferably used. As the base for preparing a phenoxide salt, a metallic salt, e.g., a lithium salt such as n-butyllithium or a sodium salt such as sodium hydride, or an organic base such as triethylamine or pyridine is preferable.

Depending upon the properties of the compound, the ligand precursor is directly reacted with the metallic compound without preparing the phenoxide salt, whereby the corresponding transition metal compound can also be synthesized.

Further, it is possible to replace the metal M in the resulting transition metal compound with another transition metal in a conventional manner. When any one of $R^1$ to $R^6$ is a hydrogen atom, a substituent other than a hydrogen atom can be introduced in any stage of the synthesis process.

The reaction solution of the ligand precursor and the transition metal M-containing compound can be used as it is without isolating the transition metal compound (B) from the solution.

The transition metal compounds (B) represented by the formula (T) are used singly or in combination of two or more kinds.

(C-1) Organometallic Compound

Examples of the organometallic compounds (C-1) employable in the invention include the below-described organometallic compounds containing metals of Group 1, Group 2, Group 12 and Group 13 of the periodic table.

(C-1a) Organoaluminum compound represented by the following formula:

$$R^a_m Al(OR^b)_n H_p X_q$$

wherein $R^a$ and $R^b$ may be the same or different and are each a hydrocarbon group of 1 to 15 carbon atoms, preferably 1 to 4 carbon atoms; X is a halogen atom; and m, n, p and q are numbers satisfying the conditions of $0<m\leq3$, $0\leq n<3$, $0\leq p<3$, $0\leq q<3$ and $m+n+p+q=3$.

(C-1b) Alkyl complex compound comprising a Group 1 metal of the periodic table and aluminum and represented by the following formula:

$$M^2 Al R^a_4$$

wherein $M^2$ is Li, Na or K; and $R^a$ is a hydrocarbon group of 1 to 15 carbon atoms, preferably 1 to 4 carbon atoms.

(C-1c) Dialkyl compound containing a Group 2 or Group 12 metal of the periodic table and represented by the following formula:

$$R^a R^b M^3$$

wherein $R^a$ and $R^b$ may be the same or different and are each a hydrocarbon group of 1 to 15 carbon atoms, preferably 1 to 4 carbon atoms; and $M^3$ is Mg, Zn or Cd.

Examples of the organoaluminum compounds (C-1a) include:

an organoaluminum compound represented by the following formula:

$$R^a_m Al(OR^b)_{3-m}$$

wherein $R^a$ and $R^b$ may be the same or different and are each a hydrocarbon group of 1 to 15 carbon atoms, preferably 1 to 4 carbon atoms; and m is preferably a number satisfying the condition of $1.5\leq m\leq 3$;

an organoaluminum compound represented by the following formula:

$$R^a_m Al X_{3-m}$$

wherein $R^a$ is a hydrocarbon group of 1 to 15 carbon atoms, preferably 1 to 4 carbon atoms; X is a halogen atom; and m is preferably a number satisfying the condition of $0<m<3$;

an organoaluminum compound represented by the following formula:

$$R^a_m Al H_{3-m}$$

wherein $R^a$ is a hydrocarbon group of 1 to 15 carbon atoms, preferably 1 to 4 carbon atoms; and m is preferably a number satisfying the condition of $2\leq m<3$; and an organoaluminum compound represented by the following formula:

$$R^a_m Al(OR^b)_n X_q$$

wherein $R^a$ and $R^b$ may be the same or different and are each a hydrocarbon group of 1 to 15 carbon atoms, preferably 1 to 4 carbon atoms; X is a halogen atom; and m, n and q are numbers satisfying the conditions of $0<m\leq3$, $0\leq n<3$, $0\leq q<3$ and $m+n+q=3$.

Particular examples of the organoaluminum compounds (C-1a) include:

tri-n-alkylaluminums, such as trimethylaluminum, triethylaluminum, tri-n-butylaluminum, tripropylaluminum, tripentylaluminum, trihexylaluminum, trioctylaluminum and tridecylaluminum;

tri-branched-chain alkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

triarylaluminums, such as triphenylaluminum and tritolylaluminum;

dialkylaluminum hydrides, such as diisobutylaluminum hydride;

trialkenylaluminums represented by $(i\text{-}C_4 H_9)_x Al_y (C_5 H_{10})_z$ (wherein x, y and z are each a positive number, and $z\geq 2x$) or the like, such as isoprenylaluminum;

alkylaluminum alkoxides, such as isobutylaluminum methoxide, isobutylaluminum ethoxide and isobutylaluminum isopropoxide;

dialkylaluminum alkoxides, such as dimethylaluminum methoxide, diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums having an average composition represented by $R^a_{2.5} Al(OR^b)_{0.5}$ or the like:

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylalumium(2,6-di-t-butyl-4-methylphenoxide) and isobutylaluminumbis(2,6-di-t-butyl-4-methylphenoxide);

dialkylaluminum halides, such as dimethylaluminum chloride, diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable is a compound analogous to the organoaluminum compound (C-1a), such as an organoaluminum compound wherein two or more aluminum compounds are combined through a nitrogen atom. An example of such compound is $(C_2H_5)_2 Al N(C_2H_5) Al(C_2H_5)_2$.

Examples of the organoaluminum compounds (C-1b) include $LiAl(C_2H_5)_4$ and $LiAl(C_7H_{15})_4$.

Other compounds, such as methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium, are also employable as the organometallic compounds (C-1).

Combinations of compounds capable of producing the above-mentioned organoaluminum compounds in the polymerization system, e.g., a combination of halogenated aluminum and alkyllithium and a combination of halogenated aluminum and alkylmagnesium, are also employable.

Of the organometallic compounds (C-1) mentioned above, organoaluminum compounds are preferable.

The organometallic compounds (C-1) mentioned above are used singly or in combination of two or more kinds.

(C-2) Organoaluminum Oxy-compound

The organoaluminum oxy-compound (B-2) may be a hitherto known aluminoxane or may be such a benzene-insoluble organoaluminum oxy-compound as exemplified in Japanese Patent Laid-Open Publication No. 78687/1990.

The hitherto known aluminoxane can be prepared by, for example, the following processes, and is generally obtained as a hydrocarbon solvent solution.

(1) An organoaluminum compound such as trialkylaluminum is added to a hydrocarbon medium suspension of a compound containing adsorption water or a salt containing water of crystallization, e.g., magnesium chloride hydrate, copper sulfate hydrate, aluminum sulfate hydrate, nickel sulfate hydrate or cerous chloride hydrate, to allow the organoaluminum compound to react with the adsorption water or the water of crystallization.

(2) Water, ice or water vapor is allowed to directly act on an organoaluminum compound such as trialkylaluminum in a medium such as benzene, toluene, ethyl ether or tetrahydrofuran.

(3) An organotin oxide such as dimethyltin oxide or dibutyltin oxide is allowed to react with an organoaluminum compound such as trialkylaluminum in a medium such as decane, benzene or toluene.

The aluminoxane may contain a small amount of an organometallic component. Further, it is possible that the solvent or the unreacted organoaluminum compound is removed from the recovered solution of aluminoxane by distillation and the remainder is redissolved in a solvent or suspended in a poor solvent for aluminoxane.

Examples of the organoaluminum compounds used for preparing the aluminoxane include the same organoaluminum compounds as previously described with respect to the organoaluminum compound (C-1a).

Of these, preferable are trialkylaluminums and tricycloalkylaluminums, and particularly preferable is trimethylaluminum. The organoaluminum compounds are used singly or in combination of two or more kinds.

Examples of the solvents used for preparing the aluminoxane include aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosine and gas oil; and halides of these aromatic, aliphatic and alicyclic hydrocarbons (e.g., chlorides and bromides thereof). Also employable are ethers such as ethyl ether and tetrahydrofuran. Of the solvents, particularly preferable are aromatic hydrocarbons and aliphatic hydrocarbons.

The benzene-insoluble organoaluminum oxy-compound is preferably an organoaluminum oxy-compound containing an Al component which is soluble in benzene at 60° C. in an amount of usually not more than 10%, preferably not more than 5%, particularly preferably not more than 2%, in terms of Al atom. That is, the benzene-insoluble organoaluminum oxy-compound is preferably insoluble or sparingly soluble in benzene.

The organoaluminum oxy-compound employable may be an organoaluminum oxy-compound containing boron and represented by the following formula (II):

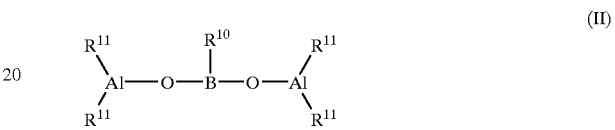

wherein $R^{10}$ is a hydrocarbon group of 1 to 10 carbon atoms; and each $R^{11}$ may be the same or different and is a hydrogen atom, a halogen atom or a hydrocarbon group of 1 to 10 carbon atoms.

The organoaluminum compound containing boron and represented by the formula (II) can be prepared by allowing an alkylboronic acid represented by the following formula (III) to react with an organoaluminum compound in an inert solvent at a temperature of −80° C. to room temperature for 1 minute to 24 hours in an inert gas atmosphere.

wherein $R^{10}$ is the same group as described above.

Examples of the alkylboronic acids represented by the formula (III) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluoroboronic acid, pentafluorophenylboronic acid and 3,5-bis(trifluoromethyl)phenylboronic acid. Of these, preferable are methylboronic acid, n-butylboronic acid, isobutylboronic acid, 3,5-difluorophenylboronic acid and pentafluorophenylboronic acid. These alkylboronic acids are used singly or in combination of two or more kinds.

Examples of the organoaluminum compounds to be reacted with the alkylboronic acid include the same organoaluminum compounds as previously described with respect to the organoaluminum compound (C-1a).

Of these, preferable are trialkylaluminums and tricycloalkylaluminums, and particularly preferable are trimethylaluminum, triethylaluminum and triisobutylaluminum. These organoaluminum compounds are used singly or in combination of two or more kinds.

The organoaluminum oxy-compounds (B-2) mentioned above are used singly or in combination of two or more kinds.

(C-3) Compound which Reacts with the Transition Metal Compound to Form Ion Pair Examples of the compounds (C-3) which react with the transition metal compound (A) or the transition metal compound (B) to form an ion pair (referred to as "ionizing ionic compound" hereinafter) include Lewis acid, an ionic compound, a borane compound and a carborane compound described in Japanese Patent Laid-Open Publications No. 501950/1989, No. 502036/1989, No. 19005/1991, No. 179006/1991, No. 207703/1991 and No. 207704/1991, and U.S. Pat. No. 5,321,106. A heteropoly compound and an isopoly compound are also available.

The Lewis acid is, for example, a compound represented by $BR_3$ (R is fluorine or a phenyl group which may have a substituent such as fluorine, methyl or trifluoromethyl). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compound is, for example, a compound represented by the following formula (IV).

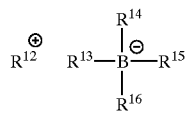

(IV)

In the above formula, $R^{12}$ is $H^+$, carbonium cation, oxonium cation, ammonium cation, phosphonium cation, cycloheptyltrienyl cation, ferrocenium cation having a transition metal, or the like.

$R^{13}$ to $R^{16}$ may be the same or different and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^{12}$ is preferably carbonium cation, ammonium cation or the like, particularly preferably triphenylcarbonium cation, N,N-dimethylanilinium cation or N,N-diethylanilinium cation.

Also available as the ionic compound is a trialkyl-substituted ammonium salt, an N,N-dialkylanilinium salt, a dialkylammonium salt or a triarylphosphonium salt.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluoromethylphenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

Examples of the dialkylammonium salts include di(1-propyl)ammoniumtetra(pentafluorophenyl)boron and dicyclohexylammoniumtetra(phenyl)boron.

Further employable as the ionic compound is triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N-diethylaniliniumpentaphenylcyclopentadienyl complex or a boron compound represented by the following formula (V) or (VI).

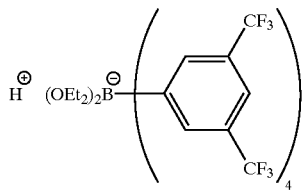

(V)

wherein Et denotes an ethyl group.

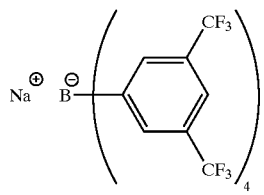

(VI)

Examples of the borane compounds include decaborane (14) salts of anions, such as bis[tri (n-butyl)ammonium] nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium] decachlorodecaborate and bis[tri(n-butyl)ammonium] dodecachlorododecaborate; and salts of metallic borane anions, such as tri(n-butyl)ammoniumbis(dodecahydridododecaborate)cobalta te(III) and bis[tri(n-butyl)ammonium] bis-(dodecahydridododecaborate)nickelate(III).

Examples of the carborane compounds include: salts of anions, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6- carbadecaborate(12), tri(n-butyl)ammonium-7-carbaundecaborate(13), tri(n-butyl)ammonium-7,8-dicarbaundecaborate(12), tri(n-butyl)ammonium-2,9-dicarbaundecaborate(12), tri(n-butyl)ammoniumdodecahydrido-8-methyl-7,9-dicarbaundecaborate, tri(n-butyl)ammoniumundecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and salts of metallic carborane anions, such as tri(n-butyl)ammoniumbis(nonahydrido-1,3-dicarbanonaborate)cobaltate(III), tri(n-butyl)ammoniumbis(undecahydrido-7,8-dicarbaundecaborate)ferrate(III) tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate)cobaltate(III) and bis[tri(n-butyl)ammonium]bis(undecahydrido-7-carbaundecaborate)nickelate(IV).

The heteropoly compound comprises an atom selected from silicon, phosphorus, titanium, germanium, arsenic and tin and one or more atoms selected from vanadium, niobium, molybdenum and tungsten. Examples of such compounds include phosphovanadic acid, germanovanadic acid, arsenovanadic acid, phosphoniobic acid, germanoniobic acid, silicomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, and salts of these acids, e.g., salts of these acids and metals of Group 1 or Group 2 of the periodic table such as lithium, sodium, potassium, rubidium, cesium, beryllium, magnesium, calcium, strontium and barium, and organic salts such as triphenylethyl salt.

The ionizing ionic compounds (C-3) mentioned above are used singly or in combination of two or more kinds.

In the olefin polymerization catalyst of the invention, the below-described carrier (D) can be used if necessary, in addition to the transition metal compound (A), the transition metal compound (B) and at least one compound (C) selected from the organometallic compound (C-1), the organoaluminum oxy-compound (C-2) and the ionizing ionic compound (C-3).

(D) Carrier

The carrier (D) is an inorganic or organic compound and is a granular or particulate solid. As the inorganic compound, a porous oxide, an inorganic chloride, clay, a clay mineral or an ion-exchange layered compound is preferable.

Examples of the porous oxides employable in the invention include $SiO_2$, $Al_2O_3$, MgO, ZrO, $TiO_2$, $B_2O_3$, CaO, ZnO, BaO, $ThO_2$, and complex compounds or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Of these, preferable are compounds each containing $SiO_2$ and/or $Al_2O_3$ as the main component.

The inorganic oxides may contain small amounts of carbonate, sulfate, nitrate and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

Although the porous oxides differ in their properties depending upon the type and the preparation thereof, the carrier preferably used in the invention desirably has a particle diameter of 10 to 300 μm, preferably 20 to 200 μm, a specific surface area of 50 to 1,000 $m^2/g$, preferably 100 to 700 $m^2/g$, and a pore volume of 0.3 to 3.0 $cm^3/g$. According to the necessity, the carrier is calcined at 100 to 1,000° C., preferably 150 to 700° C., prior to use.

Examples of the inorganic chlorides employable in the invention include $MgCl_2$, $MgBr_2$, $MnCl_2$ and $MnBr_2$. The inorganic chloride may be used as it is, or may be used after pulverized by a ball mill or an oscillating mill. Also employable is a precipitate in the form of fine particles obtained by dissolving the inorganic chloride in a solvent such as an alcohol and then conducting precipitation using a precipitant.

The clay is usually constituted mainly of a clay mineral. The ion-exchange layered compound is a compound having a crystal structure wherein planes formed by ionic bonding or the like are laminated in parallel to one another with a weak bond strength, and the ions contained therein are exchangeable. Most of clay minerals are ion-exchange layered compounds. The clay, the clay minerals and the ion-exchange layered compounds employable in the invention are not limited to natural ones but include synthetic ones.

Examples of such clay, clay minerals and ion-exchange layered compounds include clay, clay minerals and ion crystalline compounds having layered crystal structures such as hexagonal closest packing type, antimony type, $CdCl_2$ type and $CdI_2$ type.

Particular examples of the clay and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Particular examples of the ion-exchange layered compounds include crystalline acid salts of polyvalent metals, such as α-Zr(HAsO$_4$)$_2$.H$_2$O, α-Zr(HPO$_4$)$_2$, α-Zr(KPO$_4$)$_2$.3H$_2$O, α-Ti(HPO$_4$)$_2$, α-Ti(HAsO$_4$)$_2$.H$_2$O, α-Sn(HPO$_4$)$_2$.H$_2$O, γ-Zr(HPO$_4$)$_2$, γ-Ti(HPO$_4$)$_2$ and γ-Ti(NH$_4$PO$_4$)$_2$.H$_2$O, The clay, the clay minerals and the ion-exchange layered compounds are preferably those having a pore volume, as measured on pores having a radius of not less than 20 Å by a mercury penetration method, of not less than 0.1 cc/g, and are particularly preferably those having a pore volume of 0.3 to 5 cc/g. The pore volume is measured on the pores having a radius of 20 to 3×10$^4$ Å by a mercury penetration method using a mercury porosimeter.

If a compound having a pore volume, as measured on pores having a radius of not less than 20 Å, of less than 0.1 cc/g is used as the carrier, high polymerization activity tends to be hardly obtained.

It is preferable to subject the clay and the clay minerals to chemical treatments. Any of surface treatments to remove impurities from the surface and treatments having an influence on the crystal structure of the clay is employable.

Examples of such chemical treatments include acid treatment, alkali treatment, salt treatment and organic substance treatment. The acid treatment contributes to not only removing impurities from the surface but also eluting cations such as Al, Fe and Mg present in the crystal structure to increase the surface area. The alkali treatment destroys crystal structure of clay to bring about change in the structure of the clay. The salt treatment and the organic substance treatment can produce ionic complex, molecular complex, organic derivative or the like and change the surface area or the distance between layers.

The ion-exchange layered compound may be a layered compound in which the exchangeable ions between layers have been exchanged with other large and bulky ions utilizing ion exchange properties to enlarge the distance between the layers. The bulky ion plays a pillar-like roll to support the layer structure and is usually called a "pillar". Introduction of other substances between layers of a layered compound is called "intercalation". Examples of the guest compounds to be intercalated include cationic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$. These compounds are used singly or in combination of two or more kinds.

The intercalation of these compounds may be carried out in the presence of a polymerization product obtained by hydrolysis of a metallic alkoxide such as $Si(OR)_4$, $Al(OR)_3$ or $Ge(OR)_4$ (R is a hydrocarbon group or the like) or in the presence of a colloidal inorganic compound such as $SiO_2$. Examples of the pillars include oxides produced by intercalation of the above-mentioned metallic hydroxide ions between layers, followed by dehydration under heating.

The clay, clay minerals and ion-exchange layered compounds mentioned above may be used as they are, or may be used after subjected to a treatment of ball milling, sieving or the like. Moreover, they may be used after subjected to water adsorption or dehydration under heating. The clay, clay minerals and ion-exchange layered compounds may be used singly or in combination of two or more kinds.

Of the above-mentioned materials, preferable are clay and clay minerals, and particularly preferable are montmorillonite, vermiculite, pectolite, taeniolite and synthetic mica.

The organic compound is, for example, a granular or particulate solid having a particle diameter of 10 to 300 μm. Examples of such compounds include (co)polymers produced using as a main ingredient an α-olefin of 2 to 14 carbon atoms such as ethylene, propylene, 1-butene or 4-methyl-1-pentene, (co)polymers produced using as a main ingredient vinylcyclohexane or styrene, and modification products thereof.

The olefin polymerization catalyst may further contain the below-described specific organic compound component (E) if necessary, in addition to the transition metal compound (A) (component (A)), the transition metal compound (B) (component (B)), at least one compound (C) (component (C)) selected from the organometallic compound (C-1), the organoaluminum oxy-compound (C-2) and the ionizing ionic compound (C-3), and the carrier (C) optionally used.

(E) Organic Compound Component

The organic compound component (E) is used, if necessary, for the purpose of improving polymerizability and properties of the resulting polymer. Examples of the organic compounds include alcohols, phenolic compounds, carboxylic acids, phosphorus compounds and sulfonates.

As the alcohols and the phenolic compounds, those represented by $R^{21}$—OH ($R^{21}$ is a hydrocarbon group of 1 to 50 carbon atoms or a halogenated hydrocarbon group of 1 to 50 carbon atoms) are usually used. The alcohols are preferably those of the above formula wherein $R^{21}$ is a halogenated hydrocarbon group. The phenolic compounds are preferably those wherein the α,α'-positions of the hydroxyl group are substituted with hydrocarbons of 1 to 20 carbon atoms.

As the carboxylic acids, those represented by $R^{22}$—COOH ($R^{22}$ is a hydrocarbon group of 1 to 50 carbon atoms or a halogenated hydrocarbon group of 1 to 50 carbon atoms, preferably a halogenated hydrocarbon group of 1 to 50 carbon atoms) are usually used.

As the phosphorus compounds, phosphoric acids having P—O—H bond, phosphates having P—OR bond or P=O bond and phosphine oxide compounds are preferably used.

As the sulfonates, those represented by the following formula (VII) are usually used.

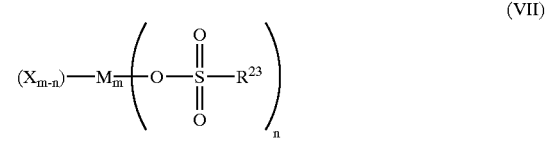

(VII)

In the above formula, M is an atom of Group 1 to Group 14 of the periodic table.

$R^{23}$ is a hydrogen atom, a hydrocarbon group of 1 to 20 carbon atoms or a halogenated hydrocarbon group of 1 to 20 carbon atoms.

X is a hydrogen atom, a halogen atom, a hydrocarbon group of 1 to 20 carbon atoms or a halogenated hydrocarbon group of 1 to 20 carbon atoms.

m is an integer of 1 to 7, and n is a number of $1 \leq n \leq 7$.

Polymerization

In the process for preparing a branched polyolefin according to the invention, an olefin is polymerized or copolymerized in the presence of the above-mentioned olefin polymerization catalyst to obtain the aforesaid branched polyolefin. In FIG. 1, steps of a process for preparing an olefin polymerization catalyst of the invention are shown.

In the polymerization, the components can be used in any way and in any order. Some examples of the polymerization processes are given below.

(1) The component (A), the component (B) and the component (C) are fed to the polymerization reactor in an arbitrary order.

(2) A catalyst component wherein the component (A) is supported on the carrier (D), the component (B) and the component (C) are fed to the polymerization reactor in an arbitrary order.

(3) A catalyst component wherein the component (B) is supported on the carrier (D), the component (A) and the component (C) are fed to the polymerization reactor in an arbitrary order.

(4) A catalyst component wherein the component (C) is supported on the carrier (D), the component (A) and the component (B) are fed to the polymerization reactor in an arbitrary order.

(5) A catalyst component wherein the component (A) and the component (B) are supported on the carrier (D), and the component (C) are fed to the polymerization reactor in an arbitrary order.

(6) A catalyst component wherein the component (A) is supported on the carrier (D), a catalyst component wherein the component (B) is supported on the carrier (D), and the component (C) are fed to the polymerization reactor in an arbitrary order.

(7) A catalyst component wherein the component (A) and the component (C) are supported on the carrier (D), and the component (B) are fed to the polymerization reactor in an arbitrary order.

(8) A catalyst component wherein the component (B) and the component (C) are supported on the carrier (D), and the component (A) are fed to the polymerization reactor in an arbitrary order.

(9) A catalyst component wherein the component (A), the component (B) and the component (C) are supported on the carrier (D) is fed to the polymerization reactor.

In the above processes (1) to (8), two or more of the catalyst components may be previously contacted. In the processes (4), (7), (8) and (9) in which the component (C) is supported on the carrier (D), a component (C) which is not supported on the carrier (D) may be optionally added in an arbitrary order. In this case, the components (C) may be the same or different.

An olefin may be prepolymerized onto the solid catalyst component wherein the component (A) and the component (C) are supported on the carrier (D), the solid catalyst component wherein the component (B) and the component (C) are supported on the carrier (D) and the solid catalyst component wherein the component (A), the component (B) and the component (C) are supported on the carrier (D). On the prepolymerized solid catalyst component, a catalyst component may be further supported.

The polymerization can be carried out as any of liquid phase polymerization, such as solution polymerization or suspension polymerization, and gas phase polymerization.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

When the polymerization of an olefin is carried out using the aforesaid olefin polymerization catalyst, the component (A) is used in an amount of usually $10^{-8}$ to 1 mol, preferably $10^{-7}$ to 0.5 mol, based on 1 liter of the reaction volume, and the component (B) is used in an amount of usually $10^{-12}$ to $10^{-2}$ mol, preferably $10^{-10}$ to $10^{-3}$ mol, based on 1 liter of the reaction volume. The component (A) and the component (B) are used in such amounts that the molar ratio (B/A) of the component (B) to the component (A) becomes usually 0.00001 to 100, preferably 0.00005 to 10, more preferably 0.000075 to 1, still more preferably 0.0001 to 0.5.

The component (C-1) is used in such an amount that the molar ratio (C-1/M) of the component (C-1) to the whole transition metal atom (M) in the components (A) and (B) becomes usually 0.01 to 100000, preferably 0.05 to 50000.

The component (C-2) is used in such an amount that the molar ratio (C-2/M) of the aluminum atom in the component (C-2) to the transition metal atom (M) in the components (A) and (B) becomes usually 10 to 500000, preferably 20 to 100000.

The component (C-3) is used in such an amount that the molar ratio (C-3/M) of the component (C-3) to the transition metal atom (M) in the components (A) and (B) becomes usually 1 to 10, preferably 1 to 5.

If the component (E) is used and if the component (C) is the component (C-1), the component (E) is used in such an amount that the molar ratio (E/C-1) becomes usually 0.01 to 10, preferably 0.1 to 5. If the component (E) is used and if the component (C) is the component (C-2), the component (E) is used in such an amount that the molar ratio (E/C-2) becomes usually 0.001 to 2, preferably 0.005 to 1. If the component (E) is used and if the component (C) is the component (C-3), the component (E) is used in such an amount that the molar ratio (E/C-3) becomes usually 0.01 to 10, preferably 0.1 to 5.

The temperature for the polymerization of an olefin using the olefin polymerization catalyst is in the range of usually −50 to +200° C., preferably 0 to 170° C. The polymerization pressure is in the range of usually atmospheric pressure to 9.8 MPa (100 kg/cm$^2$), preferably atmospheric pressure to 4.9 MPa (50 kg/cm$^2$). The polymerization reaction can be carried out by any of batchwise, semi-continuous and continuous processes. The molecular weight of the resulting branched polyolefin can be regulated by allowing hydrogen to be present in the polymerization system or changing the polymerization temperature. The molecular weight can be regulated also by changing the type of the component (C) used.

Examples of the olefins used in the polymerization include the aforesaid olefins of 2 to 20 carbon atoms. These olefins can be used singly or in combination of two or more kinds.

In the present invention, a branched polyolefin can be prepared by polymerizing an olefin in the presence of the olefin polymerization catalyst containing the transition metal compound (A) and the transition metal component (B) under one kind of react ion condition, or can be prepared by polymerizing an olefin in the presence of the olefin polymerization catalyst under two kinds of reaction conditions.

It is thought that when the polymerization of an olefin is carried out in the presence of the olefin polymerization catalyst containing the transition metal compound (A) and the transition metal compound (B), the vinyl-terminated macromer is produced by the transition metal compound (B) and an olefin and the vinyl-terminated macromer are copolymerized by the transition metal compound (A) to prepare a branched polyolefin.

The transition metal compound (A) can produce a polymer of a high molecular weight and can incorporate the vinyl-terminated macromer into the growing polymer chain.

The transition metal compound (B) tends to produce a polymer of a relatively low molecular weight and does not incorporate the vinyl-terminated macromer into the growing polymer chain. The transition metal compound (B) can further produce polyethylene having extremely few methyl branches, and when olefins containing ethylene are polymerized, the transition metal compound (B) tends to selectively polymerize ethylene.

In the present invention, it is preferable to carry out the preparation of the branched polyolefin continuously in two or more stages under different reaction conditions, and it is preferable to carry out the polymerization continuously under at least two kinds of reaction conditions in a polymerization reactor of one stage.

When the polymerization is carried out continuously under at least two kinds of reaction conditions, the polymerization preferably includes polymerization conducted under such conditions that the yield of a polymer produced by the transition metal compound (B) becomes higher than the yield of a polymer produced by the transition metal compound (A) (said polymerization sometimes being referred to as "polymerization B" hereinafter) and polymerization conducted under such conditions that the yield of a polymer produced by the transition metal compound (A) becomes higher than the yield of a polymer produced by the transition metal compound (B) (said polymerization sometimes being referred to as "polymerization A" hereinafter). In this case, it is preferable to conduct the polymerization B prior to the polymerization A.

When the polymerization is carried out under the conditions including the polymerization B and the polymerization A, a branched polyolefin can be prepared in a high yield, and when the polymerization B is carried out prior to the polymerization A, a branched polyolefin can be prepared in a higher yield.

It is more preferable that, after the polymerization B is completed, the precipitated polymer is dissolved in the polymerization solvent or the system is maintained at a high temperature so as not to precipitate a polymer dissolved in the polymerization solvent in the polymerization process, and then the polymerization A is conducted.

When the polymerization is carried out as described above, the vinyl-terminated macromonomer is more homogeneously dispersed in the polymerization solvent, and hence a branched polyolefin can be prepared in a higher yield.

Some examples of the processes for preparing a branched polyolefin including polymerization under such conditions that the yield of a polymer produced by the transition metal compound (B) becomes higher than the yield of a polymer produced by the transition metal compound (A) and polymerization under such conditions that the yield of a polymer produced by the transition metal compound (A) becomes higher than the yield of a polymer produced by the transition metal compound (B) are given below.

(1) In the presence of the transition metal compound (A), the transition metal compound (B) and the component (C), ethylene only or two or more kinds of olefins mainly containing ethylene are polymerized (former stage) and then propylene only or two or more kinds of olefins mainly containing propylene are polymerized (latter stage). In this case, the molar ratio (B/A) of the transition metal compound (B) to the transition metal compound (A) is so determined that the yield of a polymer produced by the transition metal compound (B) becomes higher than the yield of a polymer produced by the transition metal compound (A) in the former stage and that the yield of a polymer produced by the transition metal compound (A) becomes higher than the yield of a polymer produced by the transition metal compound (B) in the latter stage. More specifically, the molar ratio (B/A) of the transition metal compound (B) to the transition metal compound (A) is determined in the range of 1/1 to 1/1000, Preferably 1/10 to 1/500. The polymerization conditions in each stage, such as polymerization temperature, polymerization pressure and amounts of the catalyst components used, are in the above ranges.

(2) In the presence of the transition metal compound (B) and the component (C), ethylene only or two or more kinds of olefins mainly containing ethylene are polymerized (former stage), thereafter the transition metal compound (A) is added, and then propylene only or two or more kinds of olefins mainly containing propylene are polymerized (latter stage). In this case, the molar ratio (B/A) of the transition metal compound (B) to the transition metal compound (A) is so determined that the yield of a polymer produced by the transition metal compound (A) becomes higher than the yield of a polymer produced by the transition metal compound (B) in the latter stage. More specifically, the molar ratio (B/A) of the transition metal compound (B) to the transition metal compound (A) is determined in the range of 1/1 to 1/1000, preferably 1/10 to 1/500. The polymerization conditions in each stage, such as polymerization temperature, polymerization pressure and amounts of the catalyst components used, are in the above ranges.

(3) In the presence of the transition metal compound (B) and the component (C), ethylene only or two or more kinds of olefins mainly containing ethylene are polymerized (former stage), thereafter a part of the resulting slurry is withdrawn and diluted with a polymerization solvent of the latter stage to give a solution, and to the solution is added the transition metal compound (A). Then, ethylene only or two or more kinds of olefins mainly containing ethylene are polymerized (latter stage). In this case, the molar ratio (B/A) of the transition metal compound (B) to the transition metal compound (A) is so determined that the yield of a polymer produced by the transition metal compound (A) becomes higher than the yield of a polymer produced by the transition metal compound (B) in the latter stage. More specifically, the molar ratio (B/A) of the transition metal compound (B) to the transition metal compound (A) is determined in the range of 1/1 to 1/1000, preferably 1/10 to 1/500. The polymerization conditions in each stage, such as polymerization temperature, polymerization pressure and amounts of the catalyst components used, are in the above ranges.

The yield of a polymer due to each transition metal compound in each stage can be calculated by conducting each polymerization under the same conditions as mentioned above except that only the transition metal compound (A) or only the transition metal compound (B) is not contained.

By carrying out the polymerization of an olefin as described above, the branched polyolefin of the invention can be obtained, and whether a vinyl-terminated macromonomer has been copolymerized in the resulting polymer or not can be judged by, for example, the following methods.

(1) Mw of a polymer obtained by the polymerization of an olefin in the presence of the vinyl-terminated macromonomer is higher than Mw of a polymer obtained by the polymerization of an olefin under the same conditions except that the vinyl-terminated macromonomer is not present.

(2) The number of carbon atoms of branches having a length not shorter than that of hexyl as measured by $^{13}$C-NMR on a polymer obtained by the polymerization of an olefin in the presence of the vinyl-terminated macromonomer is larger than the number of carbon atoms of branches having a length not shorter than that of hexyl as measured by $^{13}$C-NMR on a polymer obtained by the polymerization of an olefin under the same conditions except that the vinyl-terminated macromonomer is not present.

(3) The melting point (Tm) of a polymer obtained by the polymerization of an olefin in the presence of the vinyl-terminated macromonomer is lower by not less than 1° C. than Tm of a polymer obtained by the polymerization of an olefin under the same conditions except that the vinyl-terminated macromonomer is not present.

(4) The solubility of a polymer obtained by the polymerization of an olefin in the presence of the vinyl-terminated macromonomer in a specific solvent at a specific temperature is different from the solubility of a mixture consisting of a polymer obtained by the polymerization of an olefin under the same conditions except that the vinyl-terminated macromonomer is not present and a vinyl-terminated macromonomer in the same amount as that of the vinyl-terminated macromonomer present in the polymerization.

(5) The melt properties, such as melt viscosity and melt tension, of a polymer obtained by the polymerization of an olefin in the presence of the vinyl-terminated macromonomer are different from those of a polymer obtained by the polymerization of an olefin under the same conditions except that the vinyl-terminated macromonomer is not present.

Of the above methods, the methods (1) to (3) are preferably used to make the judgment.

The number of carbon atoms of branches having a length not shorter than that of hexyl as measured by $^{13}$C-NMR, that is described in the method (2), is calculated by, for example, the aforesaid method.

The melting point (Tm) described in the method (3) is measured in, for example, the following manner.

Measurement of Melting Point (Tm)

An endothermic curve of a differential scanning calorimeter (DSC) is sought, and the temperature at the maximum peak position is taken as a melting point (Tm). In the measurement, a sample is placed in an aluminum pan, heated up to 20° C. at a rate of 10° C./min, maintained at 200° C. for 5 minutes, then cooled to −150° C. at a rate of 20° C./min and then heated at a rate of 10° C./min to obtain the second-run endothermic curve, and from the endothermic curve, the melting point is found.

EFFECT OF THE INVENTION

The branched polyolefin according to the invention is excellent in moldability and mechanical strength.

The branched polyolefin according to the invention has large temperature dependence of viscosity, so that in the vicinity of the die where the resin temperature is high, the viscosity is low, and hence the polyolefin is easily stretched. On the other hand, at the place apart from the vicinity of the die, the resin temperature is lowered, and thereby the viscosity is abruptly increased, so that even if there is some temperature unevenness, such stretching as reflects the temperature unevenness does not take place at the place apart from the die because the viscosity ratio between the place apart from the die and the vicinity of the die is large, and as a result, production of a film free from stretching nonuniformity is feasible. Moreover, the branched polyolefin has a low melt tension, and hence the branched polyolefin is hardly distortion-hardened even if stretched. Therefore, drawdown is likely to take place, and it becomes feasible to take off at a high speed.

The process for preparing a branched polyolefin according to the invention can efficiently prepare a branched polyolefin having the above-mentioned properties.

EXAMPLE

The present invention is further described with reference to the following examples, but it should be construed that the invention is in no way limited to those examples.

In the examples and the comparative examples, a compound represented by the following formula (A-1) (transition metal compound (A-1)) and a compound represented by the following formula (B-1) (transition metal compound (B-1)) were used as the transition metal compounds.

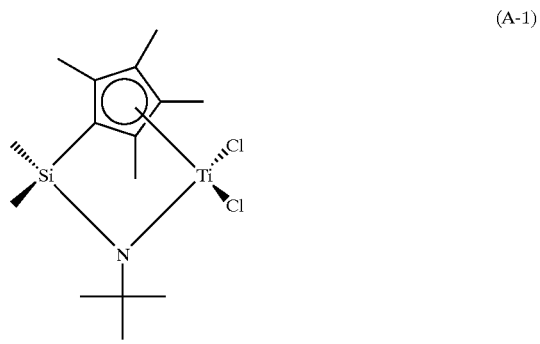

(A-1)

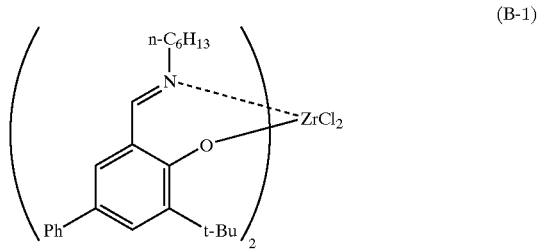

(B-1)

Example 1

Polymerization

In a 1-liter glass polymerization reactor thoroughly purged with nitrogen, 750 ml of purified toluene was placed, and ethylene was passed through the reactor for 20 minutes at a flow rate of 100 l/hr. Then, the system was heated to 50° C., and 40 mmol of commercially available methylaluminoxane (from Tohso Akuzo Co., referred to as "MAO-1" hereinafter) was added. Further, 0.3 mmol of the transition metal compound (A-1) and 0.015 mmol of the transition metal compound (B-1) were added. With stirring, ethylene was passed through the reactor at 50° C. for 10 minutes at a flow rate of 100 l/hr to perform polymerization. After the polymerization was conducted for a given period of time, a small amount of isobutyl alcohol was added, and the whole amount of the resulting slurry was introduced into a mixed liquid of 2 liters of methanol and 2 liters of acetone. After the mixture was allowed to stand still for one night, a small amount of hydrochloric acid was added, followed by filtration. The polymer separated by filtration was washed with 1 liter of methanol and then vacuum dried at 80° C. for 10 hours. The yield of the polymer (1-a) thus obtained was 21.2 g.

Preparation of Measuring Sample

To the resulting polymer, 0.1% by weight of Irganox 1076™ (available from Ciba Specialty Chemicals, Co.) and 0.1% by weight of Irgafos 168™ (available from Ciba Specialty Chemicals, Co.) were added as heat stabilizers, and the mixture was melt kneaded by a Toyo Seiki Seisakusho laboplastomill at a resin temperature of 180° C. for 5 minutes at a revolution number of 50 r.p.m. The polymer was then placed in a mold having a thickness of 2 mm and subjected to press molding using a Shindo Kinzoku Kogyosho press molding machine under the conditions of a preheating temperature of 190° C., a preheating time of 5 minutes, a heating temperature of 190° C., a heating time of 2 minutes, a heating pressure of 100 kg/cm$^2$, a cooling temperature of 20° C., a cooling time of 5 minutes and a cooling pressure of 100 kg/cm$^2$. Thus, a sample sheet having a thickness of 2 mm was prepared.

Analysis of Polymer (1-a)

When the polymer (1-a) was analyzed by GPC, two peaks were detected. In FIG. 2, a peak-separated GPC chart is shown. With respect to one peak, Mw was 73,000, Mw/Mn was 2.8, and the peak intensity ratio was 66.3%, while with respect to the other peak, Mw was 2,000, Mw/Mn was 1.7, and the peak intensity ratio was 33.7%. MFR, MT and Ea of the resulting polymer are set forth in Table 1.

Judgment of Presence of Long-chain Branch

With respect to one peak of the peaks of the polymer (1-a) detected by GPC, Mw was 73,000, as described above. It is thought that a macromonomer corresponding to the polymer (1-c) obtained in the later-described Comparative Example 2 was copolymerized by the transition metal compound (B-1), and hence the polymer (1-a) showed a higher Mw value than the polymer (1-b) obtained in the later-described Comparative Example 1. That is to say, the polymer (1-a) could be judged to be a branched polymer with a side chain having Mw of 2,000 and scarcely any methyl branch (lower than the limit of detection). When the yield ratio between the polymer (1-b) and the polymer (1-c) was watched, the ratio of the low-molecular weight portion in the polymer (1-a) ought to have been higher than that of the high-molecular weight portion, but the GPC peak intensity ratio of the high-molecular weight portion in the polymer (1-a) was higher than that of the low-molecular weight portion, and this suggests that the polymer (1-a) is a branched polymer.

Comparative Example 1

A polymer (1-b) was obtained in the same manner as in the "polymerization" of Example 1, except that the transition metal compound (B-1) was not added. The yield was 15.6 g, Mw was 56,000, Mw/Mn was 4.2, and only one peak was detected by GPC.

Comparative Example 2

A polymer (1-c) was obtained in the same manner as in the "polymerization" of Example 1, except that the transition metal compound (A-1) was not added. The yield was 42.4 g, Mw was 2,000, Mw/Mn was 2.1, and only one peak was detected by GPC. As a result of measurement of methyl branch of the polymer, no methyl branch was detected.

Comparative Example 3

MFR, MT and Ea of a commercially available ethylene/1-hexene copolymer (trade name: Evolue SP2040, from Mitsui Chemicals, Inc.) obtained by gas phase polymerization are set forth in Table. 1.

This ethylene/1-hexene copolymer had MT and MFR satisfying a relation represented by $MT \leq 2.2 \times MFR^{-0.88}$ but had Ea deviating from the range of $Ea \geq 0.385 \times C + 28.7$. From this fact, this copolymer is presumed to have a primary structure containing no long-chain branch.

Comparative Example 4

MFR, MT and Ea of a commercially available ethylene/1-octene copolymer (tradename: Affinity PL1845, from The Dow Chemicals, Co.) obtained by solution polymerization are set forth in Table. 1.

This ethylene/1-octene copolymer had Ea satisfying the requisite of $Ea \geq 0.385 \times C + 28.7$ but had MT and MFR not satisfying a relation represented by $MT \leq 2.2 \times MFR^{-0.88}$. From this fact, this copolymer is presumed to have a primary structure having a long-chain branch of a length of about twice the molecular weight between the entanglement points.

TABLE 1

| | Comonomer Type | Comonomer content (C) % by weight | MFR g/10 min | MT g | *1 | Ea × 10$^3$ J/mol | *2 | Branch of hexyl (or longer) group number of branches/1000C |
|---|---|---|---|---|---|---|---|---|
| Ex. 1 | — | 0 | 1.6 | 0.60 | 1.45 | 45.0 | 30.0 | 1.4 |
| Comp. Ex. 3 | 1-hexene | 10 | 3.8 | 0.50 | 0.68 | 31.5 | 32.5 | 0 |
| Comp. Ex. 4 | 1-octene | 13 | 3.5 | 0.79 | 0.73 | 40.3 | 33.7 | 19.8 |

*1: Value of 2.20 × MFR$^{-0.88}$
*2: Case of number of carbon atoms of α-olefin = 4–20 and C ≥ 4.1 wt %: 0.385 × C + 28.7
Case of number of carbon atoms of α-olefin = 4–20 and C < 10 wt %: 30

Example 2

Polymerization

In a 500-ml glass polymerization reactor thoroughly purged with nitrogen, 250 ml of purified toluene was placed, and ethylene was passed through the reactor for 20 minutes at a flow rate of 100 l/hr. Then, the system was heated to 50° C., followed by adding 1.25 mmol of methylaluminoxane (referred to as "MAO-2" hereinafter) as a toluene solution having been obtained by vacuum distilling toluene from a toluene solution of Albemar methylaluminoxane at 40° C. and then adding dehydrated toluene again. Further, 0.005 mmol of the transition metal compound (A-1) and 0.00025 mmol of the transition metal compound (B-1) were added. With stirring, ethylene was passed through the reactor at 50° C. for 5 minutes at a flow rate of 100 l/hr to perform polymerization. After the polymerization was conducted for a given period of time, a small amount of isobutyl alcohol was added, and the whole amount of the resulting slurry was introduced into 1 liter of methanol. After the mixture was allowed to stand still for one night, a small amount of hydrochloric acid was added, followed by filtration. The polymer separated by filtration was washed with 1 liter of methanol and then vacuum dried at 80° C. for 10 hours. The yield of the polymer (2-a) thus obtained was 0.65 g.

Analysis of Polymer (2-a)

When the polymer (2-a) was analyzed by DSC, Tm was 130° C. When the polymer was analyzed by GPC, two peaks were detected. With respect to one peak, Mw was 180,000, Mw/Mn was 2.4, and the peak intensity ratio was 64%, while with respect to the other peak, Mw was 8,000, Mw/Mn was 2.0, and the peak intensity ratio was 36%.

Judgment of Presence of Long-chain Branch

With respect to one peak of the peaks of the polymer (2-a) detected by GPC, Mw was 180,000, as described above. It is thought that a macromonomer corresponding to the polymer (2-c) obtained in the later-described Comparative Example 6 was polymerized by the transition metal compound (B-1), and hence the polymer (2-a) showed a higher Mw value than the polymer (2-b) obtained in the later-described Comparative Example 5. That is to say, the polymer (2-a) could be judged to be a branched polymer with a side chain having Mw of 8,000 and scarcely any methyl branch (lower than the limit of detection).

When the yields of the polymer (2 b) and the polymer (2-c) were watched, the yield of the low-molecular weight portion in the polymer (2-a) which was a polymer produced by the transition metal compound (A-1) and the transition metal compound (B-1) ought to have been higher than that of the high-molecular weight portion, but the GPC peak intensity ratio of the high-molecular weight portion in the polymer (2-a) was higher than that of the low-molecular weight portion, and this suggests that the polymer (2-a) is not a mixture of a polymer produced by the transition metal compound (A-1) and a polymer produced by the transition metal compound (B-1) but a branched polymer wherein a part of the polymer (vinyl-terminated macromer) produced by the transition metal compound (B-1) was copolymerized by the transition metal compound (A-1).

Comparative Example 5

A polymer (2-b) was obtained in the same manner as in the "polymerization" of Example 2, except that the transition metal compound (B-1) was not added. The yield was 0.18 g, Tm was 133° C., Mw was 110,000, Mw/Mn was 4.1, and only one peak was detected by GPC.

Comparative Example 6

A polymer (2-c) was obtained in the same manner as in the "polymerization" of Example 2, except that the transition metal compound (A-1) was not added. The yield was 0.96 g, Tm was 128° C., Mw was 8,000, Mw/Mn was 2.1, and only one peak was detected by GPC. As a result of measurement of methyl branch of the polymer, no methyl branch was detected.

Example 3

Polymerization

In a 500-ml glass polymerization reactor thoroughly purged with nitrogen, 250 ml of purified toluene was placed, and ethylene was passed through the reactor for 20 minutes at a flow rate of 100 l/hr. Then, the system was heated to 50° C., and 1.25 mmol of MAO-1 was added. Further, 0.005 mmol of the transition metal compound (A-1) and 0.00025 mmol of the transition metal compound (B-1) were added. With stirring, ethylene was passed through the reactor at 50° C. for 5 minutes at a flow rate of 100 l/hr to perform polymerization.

Then, feeding of ethylene was stopped, and with stirring, propylene was passed through the reactor at 50° C. for 1 hour at a flow rate of 100 l/hr to perform polymerization of the second stage. After the polymerization was conducted for a given period of time, a small amount of isobutyl alcohol was added, and the whole amount of the resulting slurry was introduced into 1 liter of methanol. After the mixture was allowed to stand still for one night, a small amount of hydrochloric acid was added, followed by filtration. The polymer separated by filtration was washed with 1 liter of methanol and then vacuum dried at 80° C. for 10 hours. The yield of the polymer (3-a) thus obtained was 8.39 g.

Analysis of Polymer (3-a)

When the polymer (3-a) was analyzed by DSC, Tm was 125° C. When the polymer was analyzed by GPC, a single peak having a shoulder peak with Mw of about 8,000 was detected. With respect to this peak, Mw was 210,000, and Mw/Mn was 2.6.

Judgment of Presence of Long-chain Branch

The Mw of the polymer (3-a) was 180,000, as described above, and this Mw was higher by 140,000 than the Mw of the polymer (3-b) obtained in the later-described Comparative Example 7. It is thought that a vinyl-terminated macromonomer corresponding to the polymer (3-c) obtained in the later-described Comparative Example 8 was copolymerized by the transition metal compound (B-1), and hence the polymer (3-a) showed a higher Mw value than the polymer (3-b). That is to say, the polymer (3-a) could be judged to be a branched polymer with a side chain having Mw of 8,000 and scarcely any methyl branch (lower than the Limit of detection). The polymer (3-a) showed Tm lower than that of the polymer (3-b) and that of the polymer (3-c), and this also suggests that the polymer (3-a) is a branched polymer.

Comparative Example 7

A polymer (3-b) was obtained in the same manner as in the "polymerization" of Example 3, except that the transition metal compound (B-1) was not added. The yield was 4.5 g, Tm was 129° C., Mw was 140,000, Mw/Mn was 2.3, and a single peak was detected by GPC.

Comparative Example 8

A polymer (3-c) was obtained in the same manner as in the "polymerization" of Example 3, except that the transition metal compound (A-1) was not added. The yield was 1.0 g, Tm was 128° C., Mw was 8,000, Mw/Mn was 2.2, and a single peak was detected by GPC. As a result of measurement of methyl branch of the polymer, no methyl branch was detected.

What is claimed is:
1. A branched polyolefin comprising:
   (i) recurring units derived from at least one olefin selected from olefins of 2 to 8 carbon atoms, and
   (ii) recurring units derived from a vinyl-terminated macromonomer comprising 50 to 100% by mol of recurring units derived from ethylene and 50 to 0% by mol of recurring units derived from an olefin of 4 to 8 carbon atoms, having a weight-average molecular weight of more than 1,400 and 3,100 or less and having less than 0.1 methyl branch, as measured by $^{13}$C-NMR, based on 1,000 carbon atoms.

2. The branched polyolefin of claim 1, wherein the weight-average molecular weight is in the range of 700 to 3500.

3. The branched polyolefin of claim 1, wherein the Mw/Mn is not less than 1.8 and less than 3.8.

4. The branched polyolefin of claim 1, having less than 0.05 methyl branch.

* * * * *